United States Patent
Lei et al.

(10) Patent No.: US 10,985,880 B2
(45) Date of Patent: Apr. 20, 2021

(54) NON-ORTHOGONAL MULTIPLE ACCESS BANDWIDTH PART CONFIGURATION

(71) Applicant: QUALCOMM Incorporated, San Diego, CA (US)

(72) Inventors: Jing Lei, San Diego, CA (US); Peter Pui Lok Ang, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/418,357

(22) Filed: May 21, 2019

(65) Prior Publication Data

US 2019/0363846 A1 Nov. 28, 2019

Related U.S. Application Data

(60) Provisional application No. 62/676,612, filed on May 25, 2018.

(51) Int. Cl.
*H04L 5/00* (2006.01)
*H04W 76/11* (2018.01)
(Continued)

(52) U.S. Cl.
CPC .......... *H04L 5/0014* (2013.01); *H04L 5/0037* (2013.01); *H04W 72/121* (2013.01);
(Continued)

(58) Field of Classification Search
CPC ..... H04W 76/00; H04W 76/11; H04W 72/02; H04W 72/04; H04W 72/044;
(Continued)

(56) References Cited

U.S. PATENT DOCUMENTS

2018/0048435 A1  2/2018 Islam et al.
2018/0123765 A1* 5/2018 Cao .................. H04L 1/1822
(Continued)

FOREIGN PATENT DOCUMENTS

WO  2017172333 A1  10/2017
WO  2018032014 A1   2/2018
WO  2018074688 A1   4/2018

OTHER PUBLICATIONS

Fujitsu: "Considerations on Procedures Related to NOMA", 3GPP Draft; 3GPP TSG RAN WG1 Meeting #93, R1-1806122 Considerations on Procedures Related to NOMA, 3rd Generation Partnership Project (3GPP), Mobile Competence Centre, 650, Route Des Lucioles, F-06921 Sophia-Antipolis Cedex, FR, vol. RAN WG1, No. Busan, Korea, May 21, 2018-May 25, 2018, May 20, 2018 (May 20, 2018), XP051441334, pp. 1-3, Retrieved from the Internet: URL: http://www.3gpp.org/ftp/Meetings%5F3GPP%5FSYNC/RAN1/Docs/ [retrieved on May 20, 2018] paragraph [0002].
(Continued)

*Primary Examiner* — Candal Elpenord
(74) *Attorney, Agent, or Firm* — Harrity & Harrity, LLP

(57) ABSTRACT

Various aspects of the present disclosure generally relate to wireless communication. In some aspects, a user equipment may receive a group-specific radio network temporary identifier (RNTI) associated with non-orthogonal multiple access (NOMA); receive an indication of whether the group-specific RNTI is associated with contention-based NOMA or contention-free NOMA; and selectively use a group-specific multiple access (MA) signature or a UE-specific MA signature for a NOMA transmission based at least in part on the indication. Numerous other aspects are provided.

30 Claims, 15 Drawing Sheets

(51) Int. Cl.
*H04W 74/00* (2009.01)
*H04W 72/12* (2009.01)

(52) U.S. Cl.
CPC ... *H04W 72/1268* (2013.01); *H04W 72/1289* (2013.01); *H04W 74/006* (2013.01); *H04W 76/11* (2018.02)

(58) Field of Classification Search
CPC . H04W 72/082; H04W 72/085; H04W 72/12; H04W 74/006; H04L 5/0014; H04L 5/0037
See application file for complete search history.

(56) References Cited

U.S. PATENT DOCUMENTS

| | | | | |
|---|---|---|---|---|
| 2018/0124684 A1* | 5/2018 | Kwon | .................. | H04W 48/10 |
| 2018/0278454 A1* | 9/2018 | Islam | .................... | H04L 5/0073 |
| 2018/0288746 A1* | 10/2018 | Zhang | .................. | H04L 1/0031 |
| 2019/0245664 A1* | 8/2019 | Kim | ...................... | H04L 5/0021 |

OTHER PUBLICATIONS

International Search Report and Written Opinion—PCT/US2019/033517—ISA/EPO—dated Oct. 30, 2019.
Partial International Search Report—PCT/US2019/033517—ISA/EPO—dated Aug. 21, 2019.

* cited by examiner

NON-ORTHOGONAL MULTIPLE ACCESS BANDWIDTH PART CONFIGURATION

CROSS-REFERENCE TO RELATED APPLICATIONS UNDER 35 U.S.C. § 119

This application claims priority to U.S. Provisional Patent Application No. 62/676,612, filed on May 25, 2018, entitled "TECHNIQUES AND APPARATUSES FOR NON-ORTHOGONAL MULTIPLE ACCESS BANDWIDTH PART CONFIGURATION," which is hereby expressly incorporated by reference herein.

FIELD OF THE DISCLOSURE

Aspects of the present disclosure generally relate to wireless communication and to techniques and apparatuses for non-orthogonal multiple access (NOMA) bandwidth part configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a group-specific radio network temporary identifier (RNTI) associated with non-orthogonal multiple access (NOMA); receiving an indication of whether the group-specific RNTI is associated with contention-based NOMA or contention-free NOMA; and selectively using a group-specific multiple access (MA) signature or a UE-specific MA signature for a NOMA transmission based at least in part on the indication.

In some aspects, a UE for wireless communication may include memory and one or more processors coupled to the memory. The memory and the one or more processors may be configured to receive a group-specific radio network temporary identifier (RNTI) associated with non-orthogonal multiple access (NOMA); receive an indication of whether the group-specific RNTI is associated with contention-based NOMA or contention-free NOMA; and selectively use a group-specific multiple access (MA) signature or a UE-specific MA signature for a NOMA transmission based at least in part on the indication.

In some aspects, a non-transitory computer-readable medium may store one or more instructions for wireless communication. The one or more instructions, when executed by one or more processors of a UE, may cause the one or more processors to receive a group-specific radio network temporary identifier (RNTI) associated with non-orthogonal multiple access (NOMA); receive an indication of whether the group-specific RNTI is associated with contention-based NOMA or contention-free NOMA; and selectively use a group-specific multiple access (MA) signature or a UE-specific MA signature for a NOMA transmission based at least in part on the indication.

In some aspects, an apparatus for wireless communication may include means for receiving a group-specific radio network temporary identifier (RNTI) associated with non-orthogonal multiple access (NOMA); means for receiving an indication of whether the group-specific RNTI is associated with contention-based NOMA or contention-free NOMA; and means for selectively using a group-specific multiple access (MA) signature or a UE-specific MA signature for a NOMA transmission based at least in part on the indication.

In some aspects, a method of wireless communication, performed by a UE, may include receiving a bandwidth part configuration for multiple non-orthogonal multiple access (NOMA) bandwidth parts, wherein different NOMA bandwidth parts correspond to different NOMA operation modes; determining a NOMA bandwidth part for the UE based at least in part on the bandwidth part configuration and a NOMA operation mode with which the UE is operating; and transmitting one or more NOMA communications on the determined NOMA bandwidth part.

In some aspects, a UE for wireless communication may include memory and one or more processors coupled to the memory. The memory and the one or more processors may be configured to receive a bandwidth part configuration for multiple non-orthogonal multiple access (NOMA) bandwidth parts, wherein different NOMA bandwidth parts correspond to different NOMA operation modes; determine a NOMA bandwidth part for the UE based at least in part on the bandwidth part configuration and a NOMA operation mode with which the UE is operating; and transmit one or more NOMA communications on the determined NOMA bandwidth part.

In some aspects, a non-transitory computer-readable medium may store one or more instructions for wireless communication. The one or more instructions, when executed by one or more processors of a UE, may cause the one or more processors to receive a bandwidth part configuration for multiple non-orthogonal multiple access (NOMA) bandwidth parts, wherein different NOMA bandwidth parts correspond to different NOMA operation modes; determine a NOMA bandwidth part for the UE based at least in part on the bandwidth part configuration and a NOMA operation mode with which the UE is operating; and transmit one or more NOMA communications on the determined NOMA bandwidth part.

In some aspects, an apparatus for wireless communication may include means for receiving a bandwidth part configuration for multiple non-orthogonal multiple access (NOMA) bandwidth parts, wherein different NOMA bandwidth parts correspond to different NOMA operation modes; means for determining a NOMA bandwidth part for the apparatus based at least in part on the bandwidth part configuration and a NOMA operation mode with which the apparatus is operating; and means for transmitting one or more NOMA communications on the determined NOMA bandwidth part.

In some aspects, a method of wireless communication, performed by a UE, may include determining that an uplink communication has failed on a first non-orthogonal multiple access (NOMA) bandwidth part; determining a second bandwidth part for transmitting the uplink communication based at least in part on determining that the uplink communication has failed on the first NOMA bandwidth part; and transmitting the uplink communication on the second bandwidth part.

In some aspects, a UE for wireless communication may include memory and one or more processors coupled to the memory. The memory and the one or more processors may be configured to determine that an uplink communication has failed on a first non-orthogonal multiple access (NOMA) bandwidth part; determine a second bandwidth part for transmitting the uplink communication based at least in part on determining that the uplink communication has failed on the first NOMA bandwidth part; and transmit the uplink communication on the second bandwidth part.

In some aspects, a non-transitory computer-readable medium may store one or more instructions for wireless communication. The one or more instructions, when executed by one or more processors of a UE, may cause the one or more processors to determine that an uplink communication has failed on a first non-orthogonal multiple access (NOMA) bandwidth part; determine a second bandwidth part for transmitting the uplink communication based at least in part on determining that the uplink communication has failed on the first NOMA bandwidth part; and transmit the uplink communication on the second bandwidth part.

In some aspects, an apparatus for wireless communication may include means for determining that an uplink communication has failed on a first non-orthogonal multiple access (NOMA) bandwidth part; means for determining a second bandwidth part for transmitting the uplink communication based at least in part on determining that the uplink communication has failed on the first NOMA bandwidth part; and means for transmitting the uplink communication on the second bandwidth part.

In some aspects, a method of wireless communication, performed by a UE, may include determining a cell identifier of a cell on which the UE is camped; determining a synchronization raster to be used to acquire a synchronization signal block on the cell; and determining a non-orthogonal multiple access (NOMA) bandwidth part based at least in part on the cell identifier and the synchronization raster.

In some aspects, a UE for wireless communication may include memory and one or more processors coupled to the memory. The memory and the one or more processors may be configured to determine a cell identifier of a cell on which the UE is camped; determine a synchronization raster to be used to acquire a synchronization signal block on the cell; and determine a non-orthogonal multiple access (NOMA) bandwidth part based at least in part on the cell identifier and the synchronization raster.

In some aspects, a non-transitory computer-readable medium may store one or more instructions for wireless communication. The one or more instructions, when executed by one or more processors of a UE, may cause the one or more processors to determine a cell identifier of a cell on which the UE is camped; determine a synchronization raster to be used to acquire a synchronization signal block on the cell; and determine a non-orthogonal multiple access (NOMA) bandwidth part based at least in part on the cell identifier and the synchronization raster.

In some aspects, an apparatus for wireless communication may include means for determining a cell identifier of a cell on which the apparatus is camped; means for determining a synchronization raster to be used to acquire a synchronization signal block on the cell; and means for determining a non-orthogonal multiple access (NOMA) bandwidth part based at least in part on the cell identifier and the synchronization raster.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
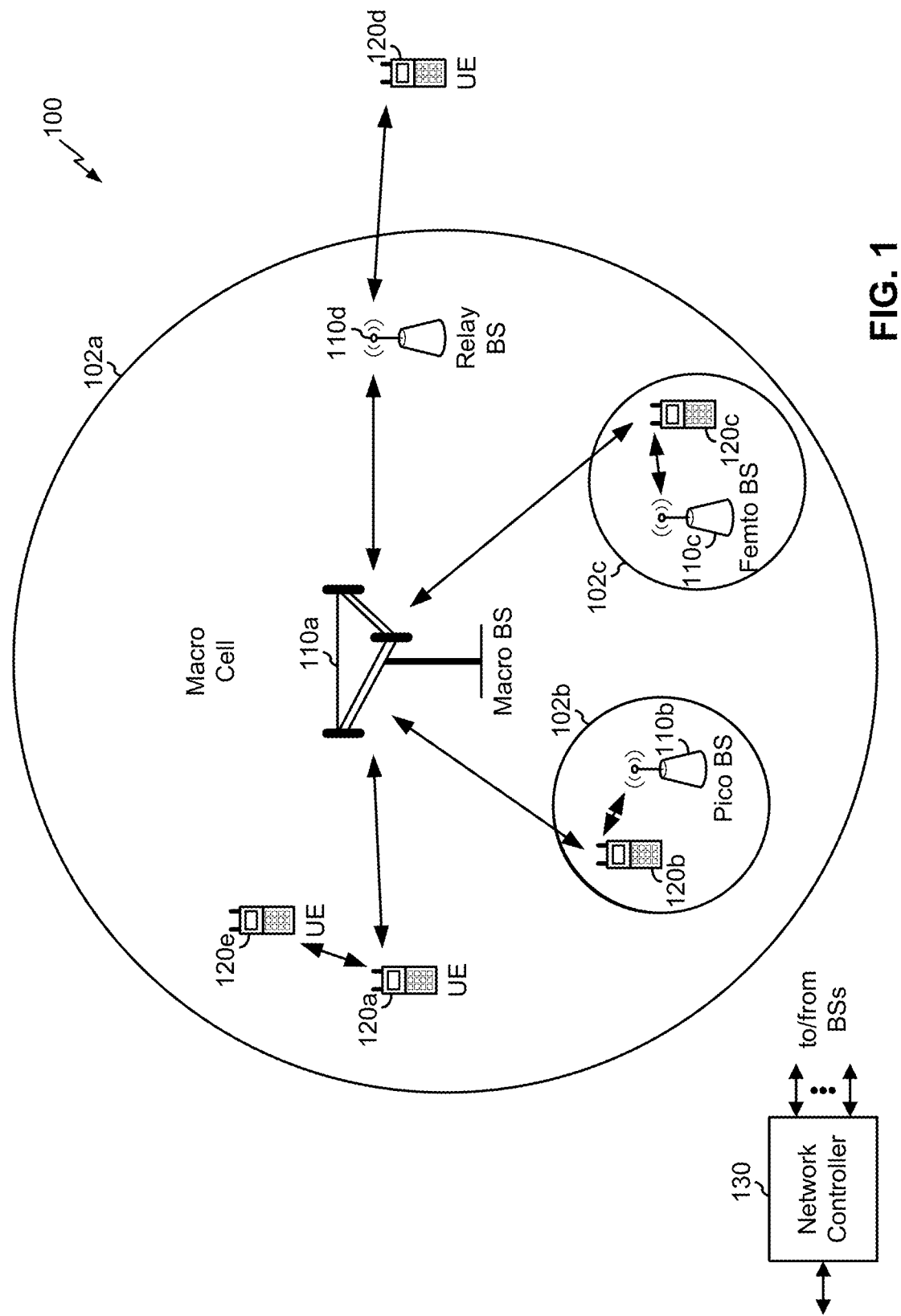
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
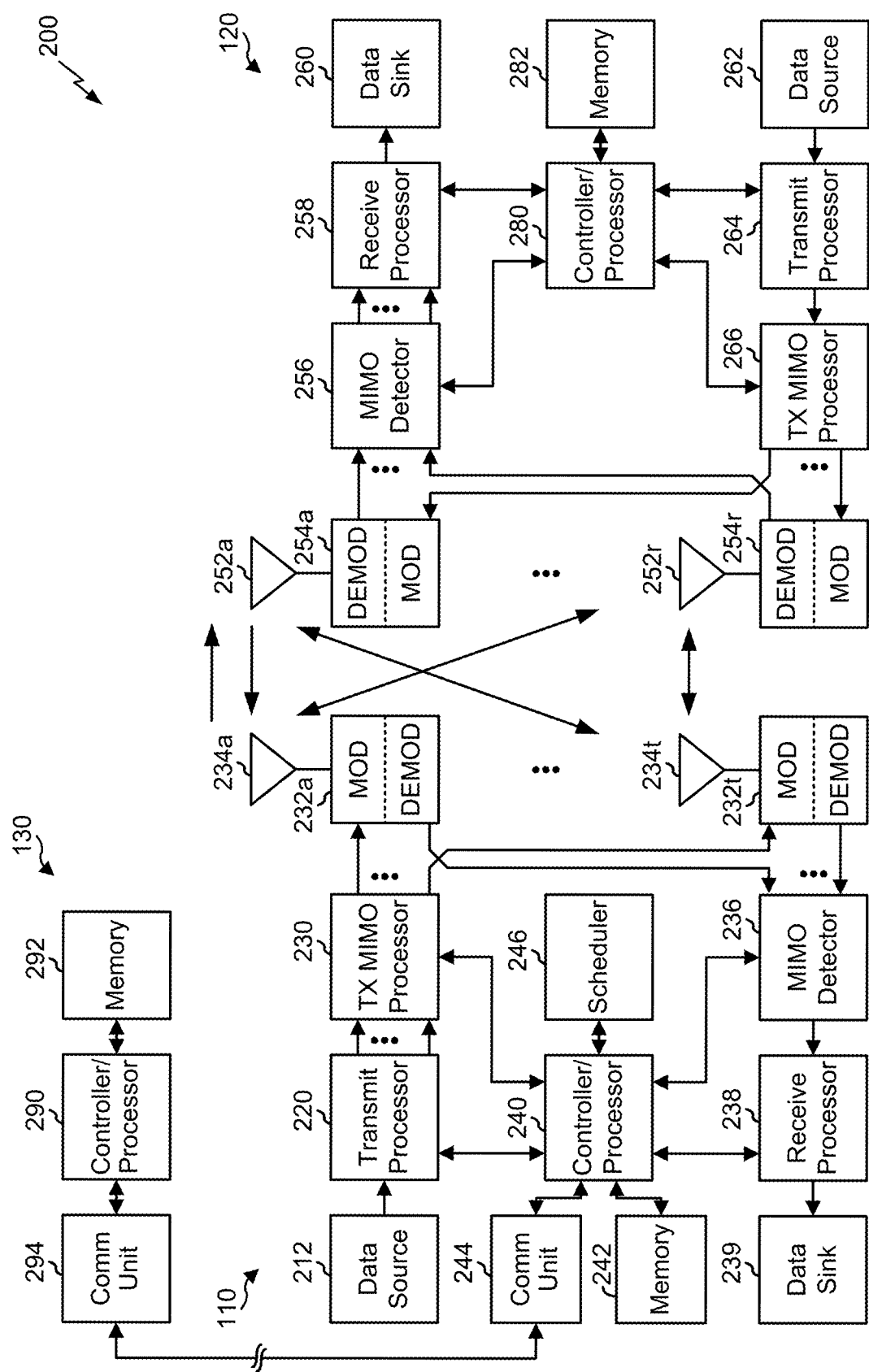
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with non-orthogonal multiple access (NOMA) bandwidth part configuration, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, process 1300 of FIG. 13, process 1400 of FIG. 14, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving a group-specific radio network temporary identifier (RNTI) associated with non-orthogonal multiple access (NOMA); means for receiving an indication of whether the group-specific RNTI is associated with contention-based NOMA or contention-free NOMA; means for selectively using a group-specific multiple access (MA) signature or a UE-specific MA signature for a NOMA transmission based at least in part on the indication; and/or the like. Additionally, or alternatively, UE 120 may include means for receiving a bandwidth part configuration for multiple non-orthogonal multiple access (NOMA) bandwidth parts, wherein different NOMA bandwidth parts correspond to different NOMA operation modes; means for determining a NOMA bandwidth part for the UE based at least in part on the bandwidth part configuration and a NOMA operation mode with which the UE is operating; means for transmitting one or more NOMA communications on the determined NOMA bandwidth part; and/or the like.

Additionally, or alternatively, UE 120 may include means for determining that an uplink communication has failed on a first non-orthogonal multiple access (NOMA) bandwidth part; means for determining a second bandwidth part for transmitting the uplink communication based at least in part on determining that the uplink communication has failed on the first NOMA bandwidth part; means for transmitting the uplink communication on the second bandwidth part; and/or the like. Additionally, or alternatively, UE 120 may include means for determining a cell identifier of a cell on which the UE is camped; means for determining a synchronization raster to be used to acquire a synchronization signal block on the cell; means for determining a non-orthogonal multiple access (NOMA) bandwidth part based at least in part on the cell identifier and the synchronization raster; and/or the like.

In some aspects, such means may include one or more components of UE 120 described in connection with FIG. 2.

As indicated above, FIG. 2 is provided merely as an example. Other examples are possible and may differ from what was described with regard to FIG. 2.

Figure 3A:
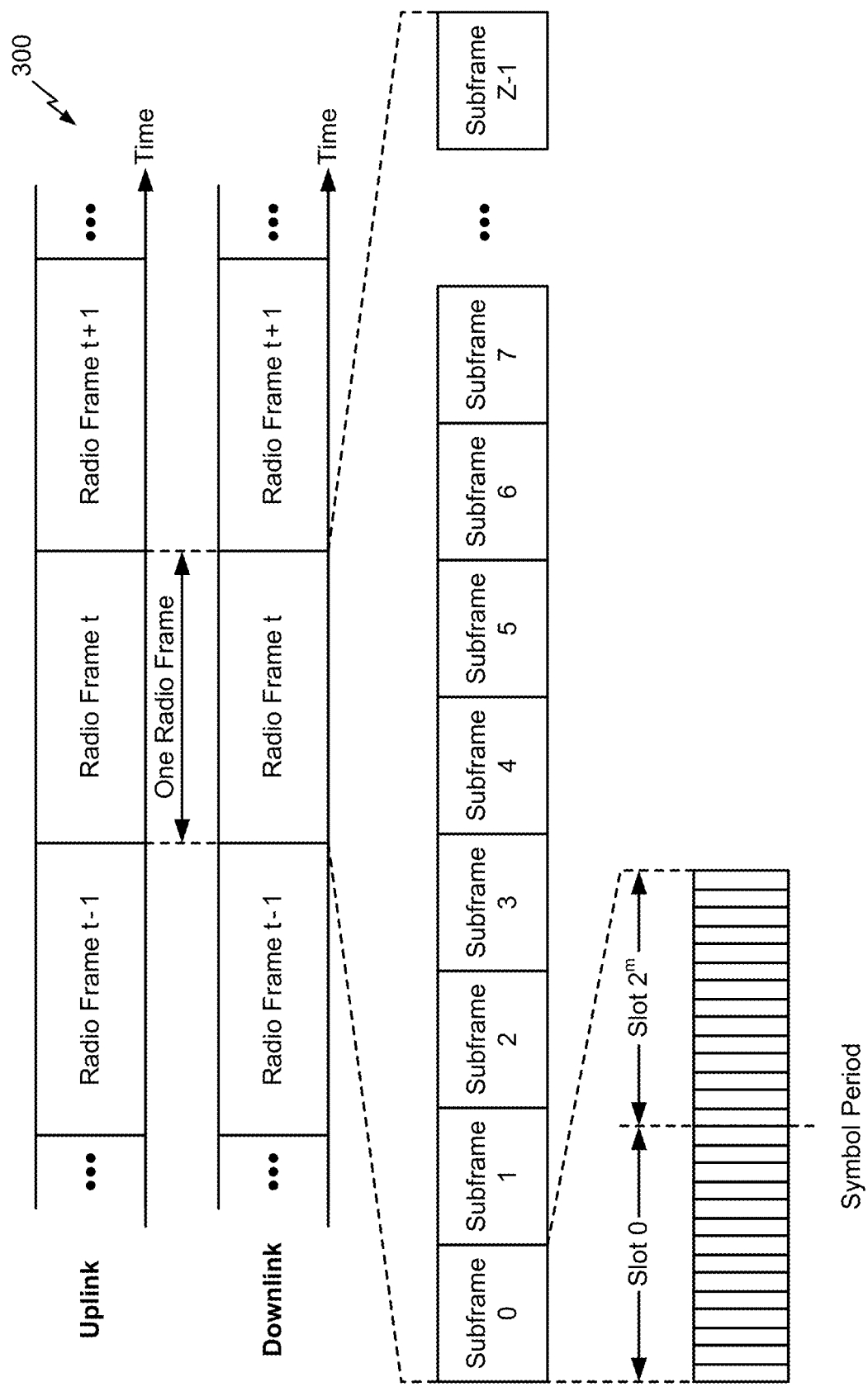
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1,2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L-1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
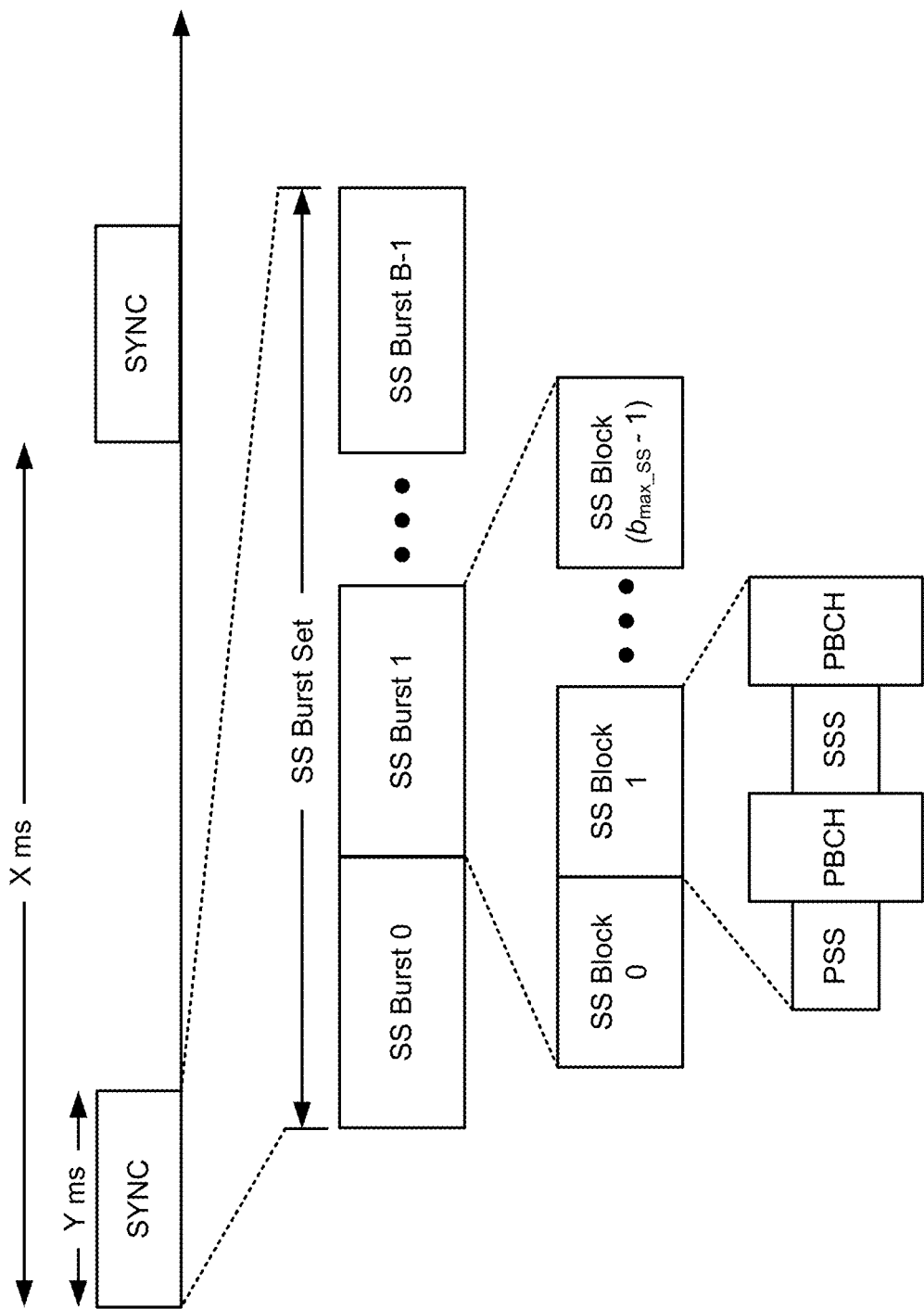
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples are possible and may differ from what was described with regard to FIGS. 3A and 3B.

Figure 4:
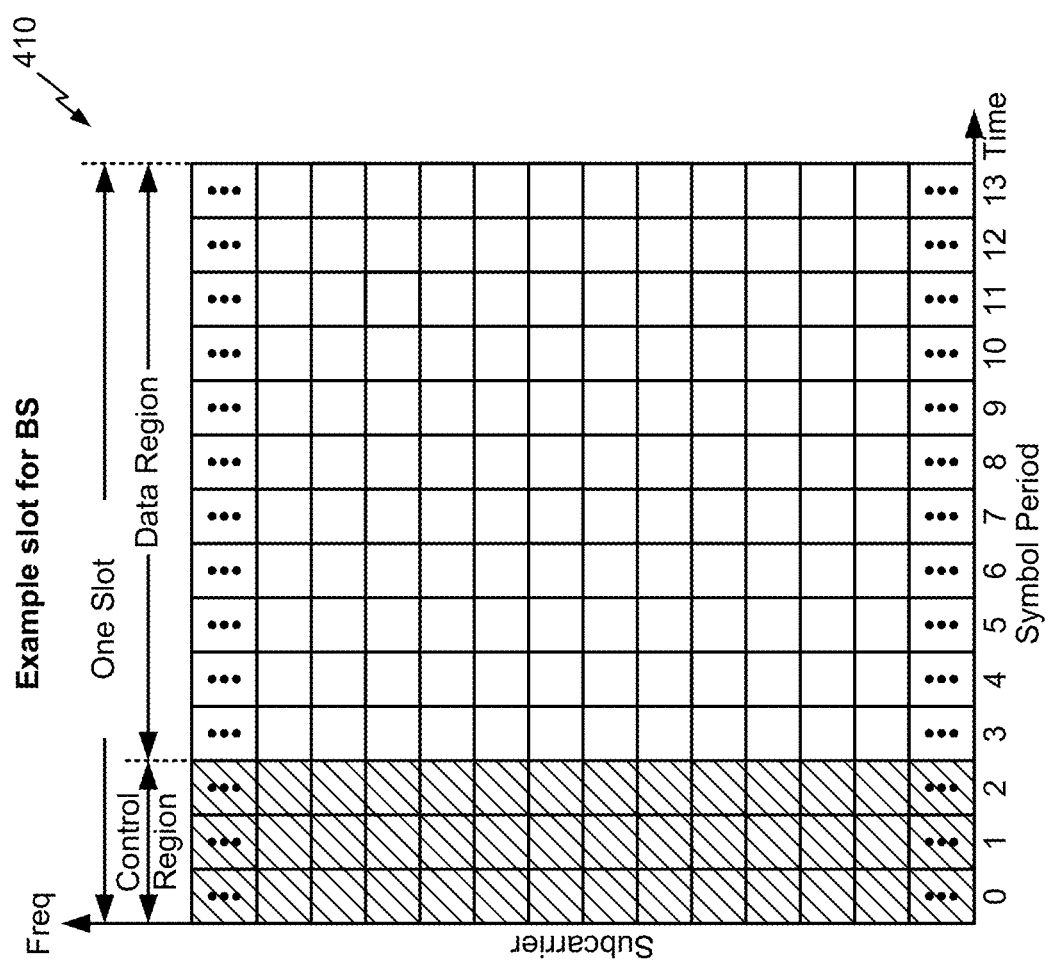
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . ,Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

In non-orthogonal multiple access (NOMA) communication systems, UEs may share resources used for uplink communications (e.g., time resources and/or frequency resources). For example, multiple UEs may transmit in the same time and frequency resource, and the uplink communications of the multiple UEs may be distinguished at a receiver (e.g., a base station 110, another UE 120, and/or the like) by using different multiple access signatures for the uplink communications. This is different from orthogonal multiple access (OMA) communication systems, which schedule different UEs to use different resources for uplink communications. Thus, a NOMA communication system may increase spectral efficiency compared to an OMA communication system, may reduce latency (e.g., because an uplink grant is not needed), and/or the like.

In NR, a bandwidth part (e.g., a portion of system bandwidth) may be flexibly configured for different use cases. By configuring a bandwidth part for a UE, the UE may save power by monitoring a portion of system bandwidth included in the bandwidth part instead of monitoring the entire system bandwidth. Furthermore, different bandwidth parts can be configured with different parameters (e.g., control channel monitoring periodicity, timing parameters, discontinuous reception (DRX) parameters, and/or the like) to tailor the bandwidth part to different use cases.

Some techniques and apparatuses described herein permit configuration of bandwidth parts for NOMA operations, which may reduce signaling overhead, save UE power, reduce latency, enhance system capacity, simplify link adaptation, permit multiplexing of different NOMA operation modes, permit multiplexing of NOMA and OMA operations, accommodate time and frequency offsets associated with a two-step random access channel (RACH) procedure, reduce inter-cell interference, reduce an adjacent channel leakage ratio, and/or the like. Additional details are described below.

Figure 5:
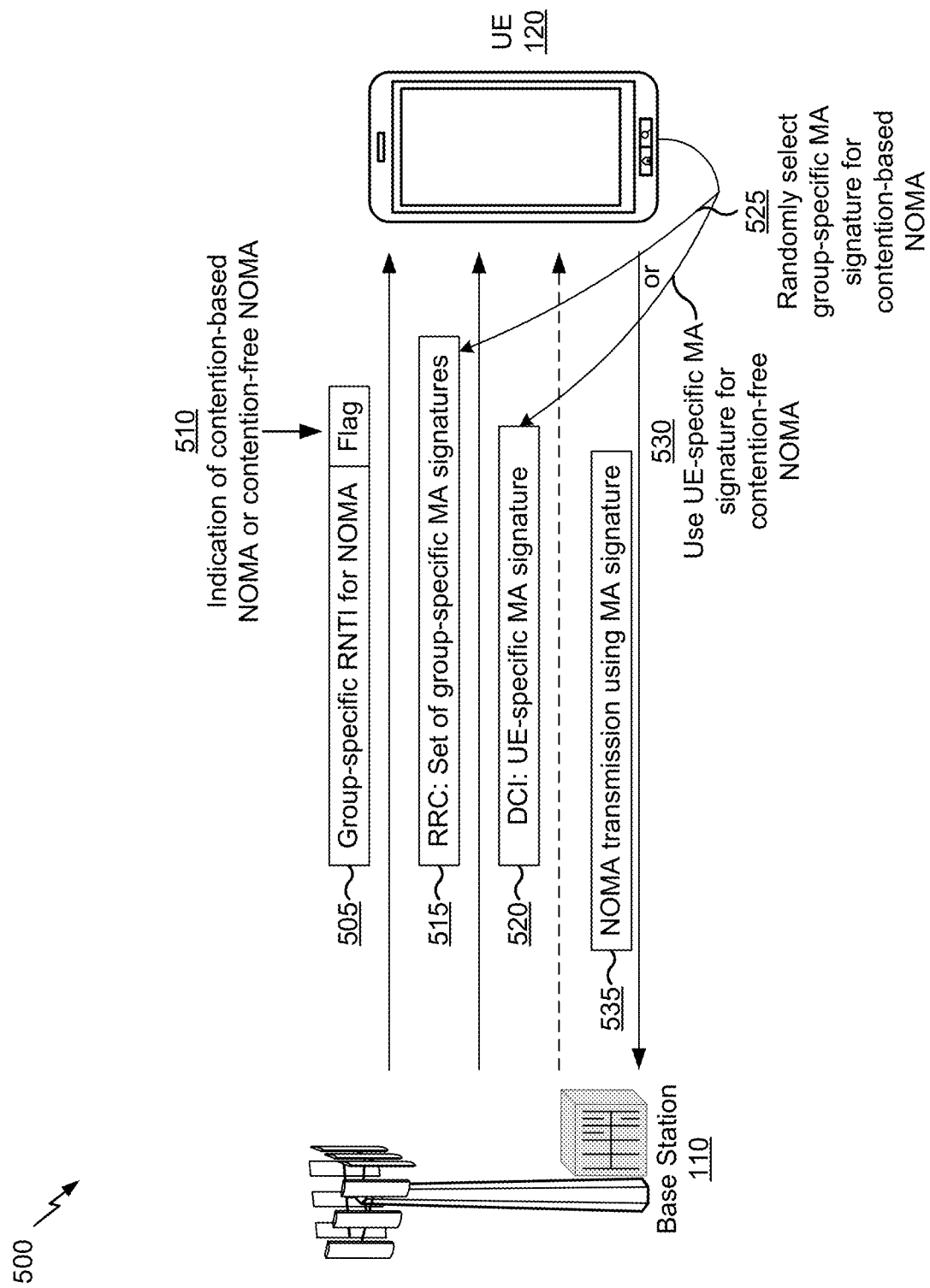
FIGS. 5-10 are diagrams illustrating examples of non-orthogonal multiple access (NOMA) bandwidth part configuration, in accordance with various aspects of the present disclosure.

FIG. 5 is a diagram illustrating an example 500 associated with NOMA bandwidth part configuration, in accordance with various aspects of the present disclosure.

As shown by reference number 505, a base station 110 may transmit, and a UE 120 may receive, a group-specific radio network temporary identifier (RNTI) associated with NOMA. In some aspects, the UE 120 may use the group-specific RNTI to monitor a control resource set (CORESET) associated with NOMA. For example, the base station 110 may scramble a control communication, intended for a group of UEs 120 associated with the group-specific RNTI, using the group-specific RNTI, such as by scrambling cyclic redundancy check (CRC) bits of the control communication using the group-specific RNTI. The UE 120 may descramble received control communications using the group-specific RNTI to identify control communications intended for the UE 120. A control communication may include, for example, a radio resource control (RRC) message, downlink control information (DCI), information transmitted on a physical downlink control channel (PDCCH), and/or the like. In some aspects, the group-specific RNTI may be preconfigured by an RRC message.

As shown by reference number 510, the base station 110 may transmit, and the UE 120 may receive, an indication of whether the group-specific RNTI is associated with contention-based NOMA or contention-free NOMA. In some aspects, the indication may be included in the group-specific RNTI, such as in a flag field (which may include 1 bit, for example). For example, a first value of the flag field (e.g., a value of zero) may indicate that the group-specific RNTI (and/or a corresponding group of UEs 120 to which the group-specific RNTI is transmitted) is associated with contention-based NOMA, and a second value of the flag field (e.g., a value of one) may indicate that the group-specific RNTI is associated with contention-free NOMA.

In a contention-based NOMA system, a UE 120 may randomly select a multiple access (MA) signature from a set of MA signatures, and may transmit a NOMA communication using the MA signature. In such as contention-based system, it is possible for multiple UEs 120 to use the same MA signature for NOMA communications transmitted in the same resources, thereby causing contention for the channel. In a contention-free NOMA system, a UE 120 may be assigned an MA signature (e.g., by a base station 110). In such a contention-free system, a central controller (e.g., the base station 110) may coordinate the use of MA signatures such that multiple UEs 120 do not transmit NOMA communications using the same MA signature in the same resources. An MA signature may refer to one or more parameters capable of being used to distinguish communications transmitted by different UEs in the same set of resources. For example, an MA signature may include one or more of a demodulation reference signal (DMRS) sequence, a preamble sequence, a spreading code, an orthogonal cover code, a scrambling sequence, an interleaving pattern, a multi-branch transmit power setting and phase rotation, and/or the like.

As shown by reference number 515, the base station 110 may transmit, and the UE 120 may receive, a set of group-specific multiple access (MA) signatures. In some aspects, the set of group-specific MA signatures may be indicated in an RRC message, a master information block (MIB), a system information block (SIB), a group common PDCCH, and/or the like. Additionally, or alternatively, the set of group-specific MA signatures may be generated as a function of the group-specific RNTI. In some aspects, the UE 120 may obtain the set of group-specific MA signatures using the group-specific RNTI. For example, the UE 120 may descramble an RRC message using the group-specific RNTI to obtain the set of group-specific MA signatures. In some aspects, all UEs 120 that receive the group-specific RNTI may receive the set of MA signatures. However, UEs 120 that operate using contention-based NOMA may randomly select an MA signature from the set of MA signatures, while UEs 120 that operate using contention-free NOMA may be assigned an MA signature.

As shown by reference number 520, the base station 110 may transmit, and the UE 120 may receive, a UE-specific MA signature. For example, if the UE 120 is to operate using contention-free NOMA (e.g., as indicated by the indication of whether the group-specific RNTI is associated with contention-free NOMA or contention-based NOMA), then the UE 120 may monitor for and receive the UE-specific MA signature. In some aspects, the UE-specific MA signature may be indicated in DCI and/or the like. In some aspects, the UE 120 may obtain the UE-specific MA signature using the group-specific RNTI. For example, the UE 120 may descramble the DCI using the group-specific RNTI to obtain the UE-specific MA signature.

In some aspects, the UE 120 may selectively use a group-specific MA signature or a UE-specific MA signature for a NOMA transmission based at least in part on the indication of whether the group-specific RNTI is associated with contention-based NOMA or contention-free NOMA. For example, as shown by reference number 525, the UE 120 may randomly select a group-specific MA signature, from the set of group-specific MA signatures, when the group-specific RNTI is associated with contention-based NOMA. In this case, the UE 120 may use the randomly selected group-specific MA signature to transmit one or more NOMA transmissions. Additionally, or alternatively, the group-specific MA signature may be generated as a function of the group-specific RNTI. In some aspects, a group-specific MA signature may be used for operation modes with less stringent requirements (e.g., lower quality of service requirements), such as best efforts traffic, machine type communication (MTC) traffic (e.g., enhanced MTC (eMTC) traffic, massive MTC (mMTC) traffic, and/or the like), enhanced mobile broadband (eMBB) traffic, and/or the like. In this way, spectral efficiency may be enhanced while still satisfying these less stringent requirements.

As another example, as shown by reference number 530, the UE 120 may use the UE-specific MA signature when the group-specific RNTI is associated with contention-free NOMA. In this case, the UE 120 may use the assigned UE-specific MA signature to transmit one or more NOMA transmissions. In some aspects, a UE-specific MA signature may be used for operation modes with more stringent requirements (e.g., higher quality of service requirements), such as ultra-reliable low latency communication (URLLC) traffic and/or the like. In this way, the more stringent requirements may be met by reducing or avoiding MA signature collisions.

As shown by reference number 535, the UE 120 may transmit, and the base station 110 may receive, a NOMA transmission that uses the selected MA signature (e.g., the group-specific MA signature or the UE-specific MA signature). For example, as described above, if the UE 120 receives an indication of contention-based NOMA, then the UE 120 may apply a randomly selected group-specific MA signature to the NOMA transmission. Alternatively, if the UE 120 receives an indication of contention-free NOMA, then the UE 120 may apply a received UE-specific MA signature to the NOMA transmission.

In some aspects, the UE 120 may transmit the NOMA transmission on a bandwidth part configured for NOMA (e.g., a NOMA bandwidth part). Additionally, or alternatively, the UE 120 may determine the NOMA bandwidth part based at least in part on a NOMA bandwidth part configuration signaled to the UE 120 by the base station 110 (e.g., in an RRC message and/or the like). In some aspects, the bandwidth part configuration may indicate multiple NOMA bandwidth parts corresponding to multiple NOMA operation modes (e.g., eMBB, eMTC, URLLC, and/or the like), and the UE 120 may determine a NOMA bandwidth part for the NOMA transmission based at least in part on an operation mode with which the UE 120 is operating. Additional details are described below in connection with FIGS. 6 and 7.

As indicated above, FIG. 5 is provided as an example. Other examples are possible and may differ from what was described with respect to FIG. 5. In some aspects, one or more aspects described in connection with FIG. 5 may be implemented in combination with one or more aspects described elsewhere herein, such as in connection with one or more of FIGS. 6, 7, 8, 9, and/or 10.

Figure 6:
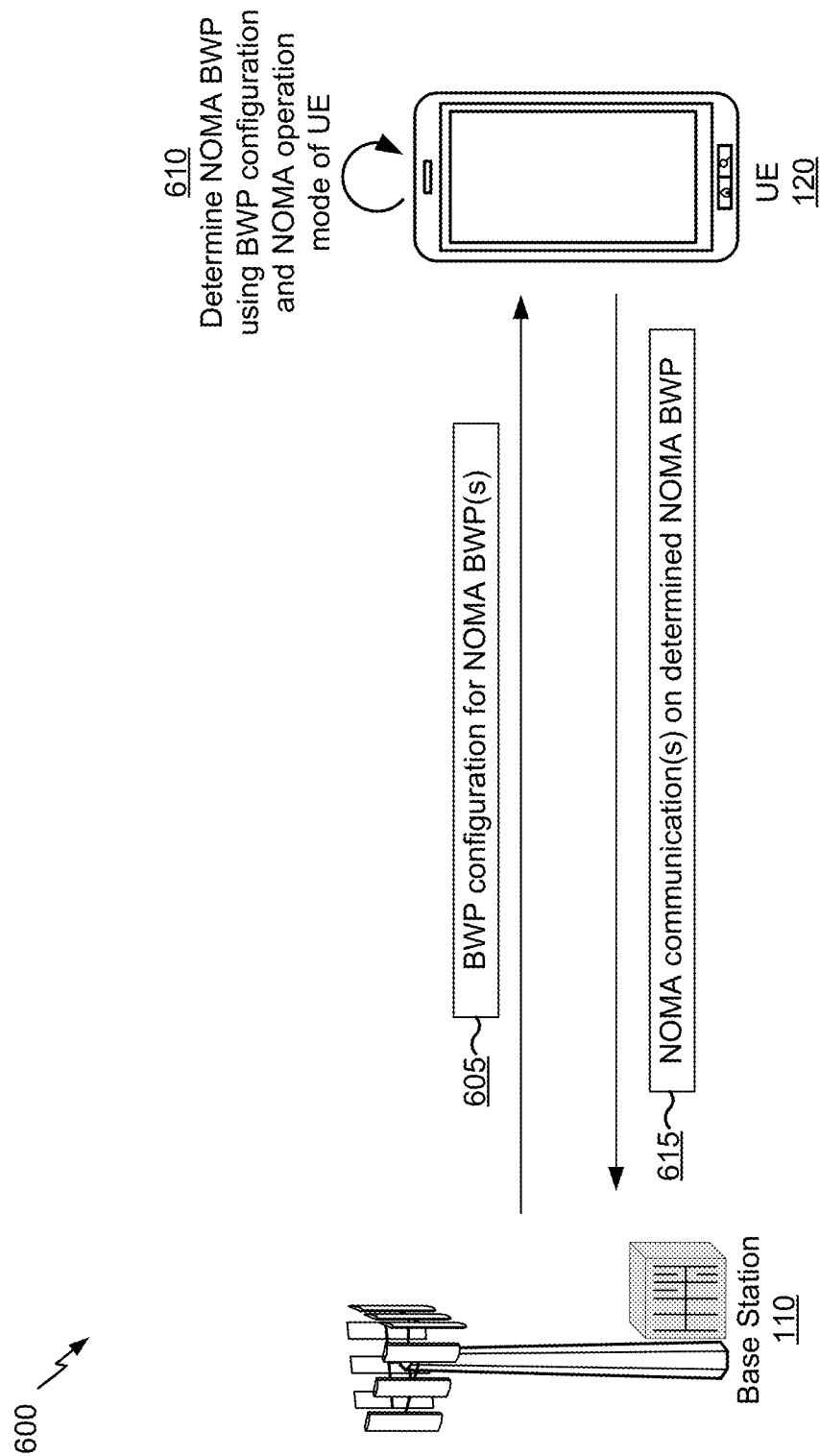

FIG. 6 is a diagram illustrating another example 600 associated with NOMA bandwidth part configuration, in accordance with various aspects of the present disclosure.

As shown by reference number 605, a base station 110 may transmit, and a UE 120 may receive, a bandwidth part configuration for multiple NOMA bandwidth parts. A NOMA bandwidth part may refer to a bandwidth part (e.g., a portion of system bandwidth) configured for NOMA operations (e.g., and not used for OMA operations). In some aspects, different NOMA bandwidth parts correspond to different NOMA operation modes (e.g., an eMBB mode, an MTC mode, a URLLC mode, and/or the like). For example, a first NOMA bandwidth part may be used for eMBB communications, a second NOMA bandwidth part may be used for eMTC communications, a third NOMA bandwidth part may be used for URLLC communications, and/or the like.

In some aspects, the bandwidth part configuration may be included in an RRC message. Additionally, or alternatively, the bandwidth part configuration may be included in DCI. In some aspects, a bandwidth part configuration indicated in DCI may override a bandwidth part configuration indicated in an RRC message. In this way, NOMA bandwidth parts may be flexibly and dynamically configured.

As shown by reference number 610, the UE 120 may determine a NOMA bandwidth part to be used by the UE 120 based at least in part on the bandwidth part configuration and a NOMA operation mode with which the UE 120 is operating. For example, the bandwidth part configuration may indicate a mapping between NOMA bandwidth parts and NOMA operation modes, and the UE 120 may use a NOMA operation mode with which the UE 120 is operating to determine a corresponding NOMA bandwidth part to be used for that NOMA operation mode. Alternatively, the base station 110 may explicitly signal a NOMA bandwidth part to be used by the UE 120 (e.g., based at least in part on an operation mode of the UE 120, which may be signaled to the base station 110 during a capability exchange and/or the like).

As shown by reference number 615, the UE 120 may transmit, and the base station 110 may receive, one or more NOMA communications on the determined NOMA bandwidth part. For example, the UE 120 may transmit the one or more NOMA communications using one or more resource blocks (e.g., time and/or frequency resources) included in the NOMA bandwidth part. Additionally, or alternatively, the UE 120 may transmit the one or more NOMA communications based at least in part on one or more parameters associated with the NOMA bandwidth part (e.g., and signaled in the bandwidth part configuration), such as a modulation and coding scheme (MCS), a spreading factor, a resource block size, a frequency location, a numerology, a periodicity, and/or the like. In some aspects, different NOMA bandwidth parts may be associated with different ones of these parameters and/or different combinations of these parameters. In this way, the NOMA bandwidth parts may be configured for a particular NOMA operation mode.

In some aspects, a NOMA bandwidth part may be associated with a contention configuration. Additionally, or alternatively, different NOMA bandwidth parts may be associated with different contention configurations. For example, a first NOMA bandwidth part may be associated with contention-based NOMA, a second NOMA bandwidth part may be associated with contention-free NOMA, and/or the like, as described above in connection with FIG. 5.

In some aspects, multiple NOMA bandwidth parts may be multiplexed with one another in at least one of a time domain or a frequency domain. Additionally, or alternatively, one or more NOMA bandwidth parts may be multiplexed with one or more OMA bandwidth part in at least one of a time domain or a frequency domain. In this way, spectral efficiency may be enhanced. Additional details are described below in connection with FIG. 7.

As indicated above, FIG. 6 is provided as an example. Other examples are possible and may differ from what was described with respect to FIG. 6. In some aspects, one or more aspects described in connection with FIG. 6 may be implemented in combination with one or more aspects described elsewhere herein, such as in connection with one or more of FIGS. 5, 7, 8, 9, and/or 10.

Figure 7:
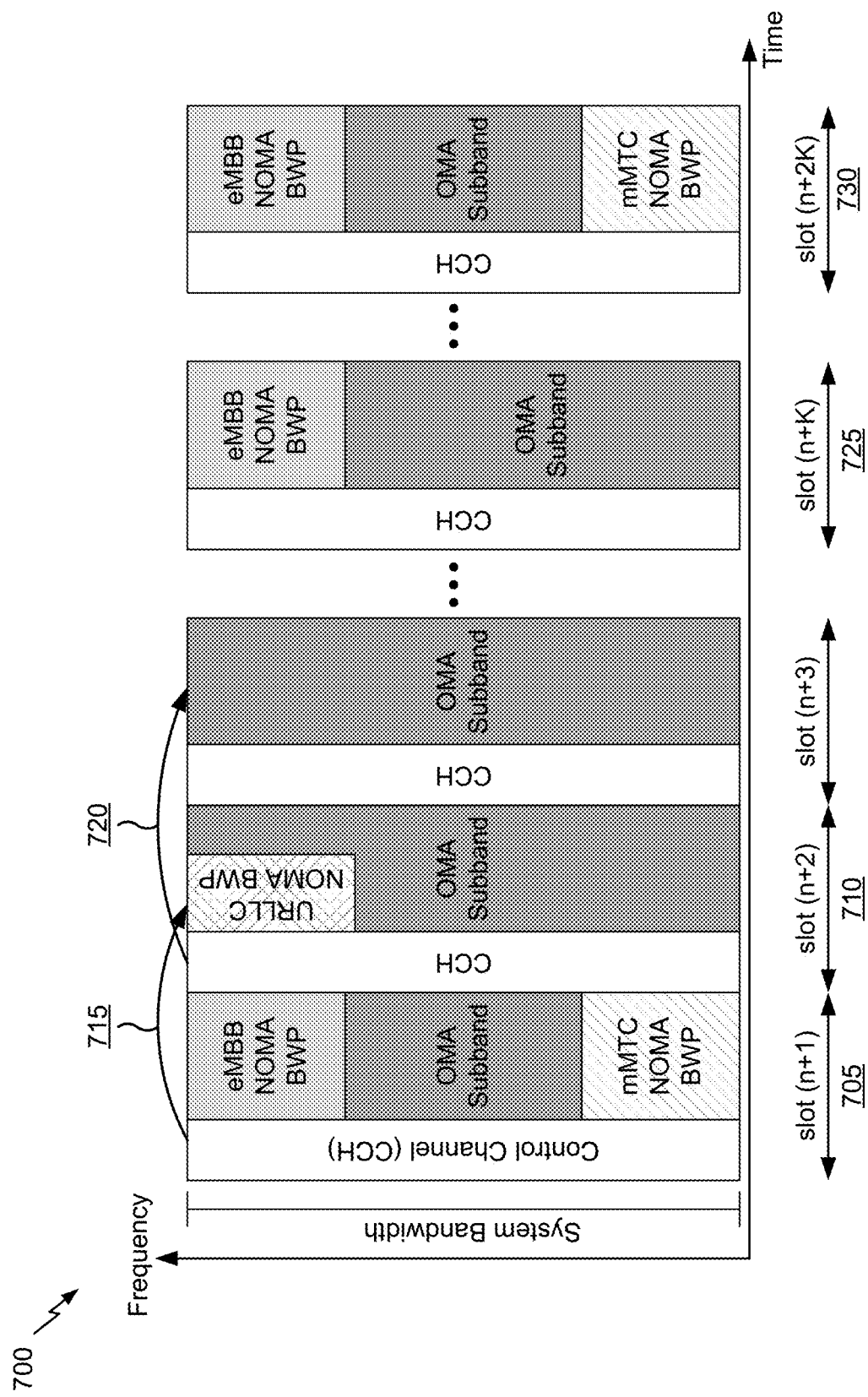

FIG. 7 is a diagram illustrating an example 700 associated with NOMA bandwidth part configuration, in accordance with various aspects of the present disclosure.

As indicated above in connection with FIG. 6, in some aspects, multiple NOMA bandwidth parts may be multiplexed with one another in at least one of a time domain or a frequency domain. For example, as shown by reference number 705, two NOMA bandwidth parts (BWPs), shown as an eMBB NOMA bandwidth part (BWP) and an mMTC NOMA bandwidth part, may be frequency-division multiplexed with one another in the frequency domain in a first slot (e.g., slot n+1). Furthermore, these two NOMA bandwidth parts may be frequency-division multiplexed with an OMA bandwidth part in the first slot. Thus, the different bandwidth parts may span different frequency portions of a system bandwidth. In this way, spectral efficiency may be improved.

As shown by reference number 710, two or more NOMA bandwidth parts may be multiplexed in a time domain. For example, a first NOMA bandwidth part, shown as an eMBB NOMA BWP, may span a set of frequencies at a first time (e.g., in slot n+1), and a second NOMA bandwidth part, shown as a URLLC NOMA BWP, may span the set of frequencies at a second time (e.g., in slot n+2). In this way, spectral efficiency may be improved.

As shown by reference number 715, in some aspects, a bandwidth part configuration may be signaled in DCI. For example, DCI, carried in a control channel (CCH) (e.g., a PDCCH) in a first slot, may signal a bandwidth part configuration for a NOMA BWP in a second slot (e.g., which may be the same slot or a future slot). As shown, the DCI in slot n+1 may signal a bandwidth part configuration for the URLLC NOMA bandwidth part in slot n+2. As shown by reference number 720, DCI in slot n+2 may signal that there is no dynamically configured NOMA bandwidth part in slot n+3. In some aspects, NOMA bandwidth parts for a first operation mode (e.g., eMBB, MTC, and/or the like) may be semi-statically configured (e.g., using an RRC message), and NOMA bandwidth parts for a second operation mode (e.g., URLLC and/or the like) may be dynamically configured (e.g., using DCI). In this way, NOMA communications with more stringent requirements may be prioritized using dynamically configured NOMA bandwidth parts for those NOMA communications.

In some aspects, different NOMA bandwidth parts may have different periodicities. For example, as shown by reference number 725, the eMBB NOMA bandwidth part may have a first periodicity of K (e.g., may occur every K slots). Similarly, as shown by reference number 730, the mMTC NOMA bandwidth part may have a periodicity of 2K (e.g., may occur every 2K slots). In this way, NOMA bandwidth parts may be configured based at least in part on an amount of traffic and/or a number of UEs 120 (e.g., in a cell) that use different NOMA operation modes, thereby efficiently using network resources.

As indicated above, FIG. 7 is provided as an example. Other examples are possible and may differ from what was described with respect to FIG. 7. In some aspects, one or more aspects described in connection with FIG. 7 may be implemented in combination with one or more aspects described elsewhere herein, such as in connection with one or more of FIGS. 5, 6, 8, 9, and/or 10.

Figure 8:
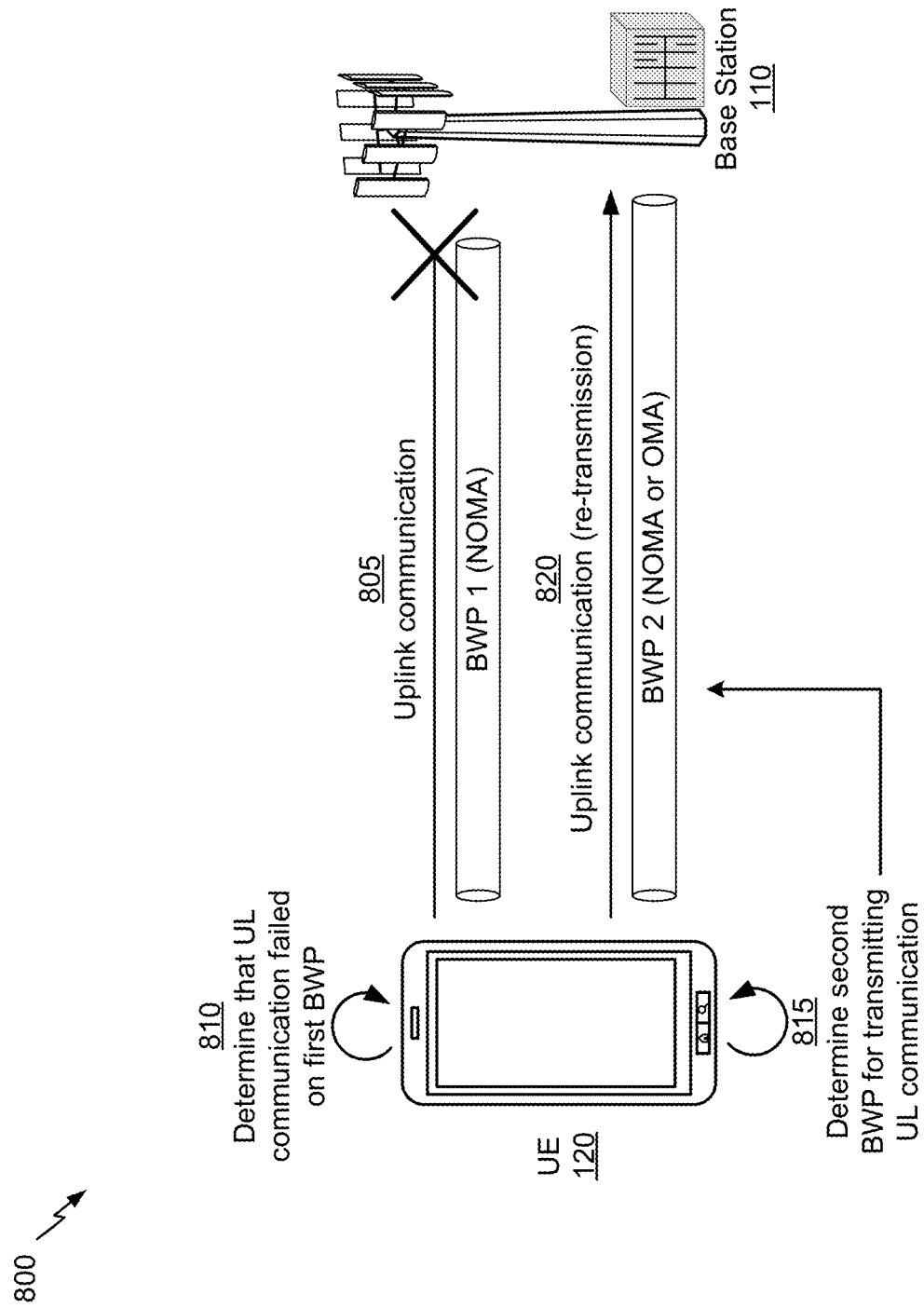

FIG. 8 is a diagram illustrating an example 800 associated with NOMA bandwidth part configuration, in accordance with various aspects of the present disclosure.

As shown by reference number 805, a UE 120 may transmit an uplink communication on a first NOMA bandwidth part (e.g., shown as BWP 1), and the uplink communication may fail. As shown by reference number 810, the UE 120 may determine that the uplink communication has failed on the first NOMA bandwidth part. For example, a base station 110 may be unable to decode the uplink communication, and may transmit a negative acknowledgment (NACK), corresponding to the uplink communication, to the UE 120. Alternatively, a timer of the UE 120 may expire without receiving acknowledgement (ACK) or NACK feedback from the base station 110. The UE 120 may determine that the uplink communication has failed on the first NOMA bandwidth part based at least in part on expiration of the timer, receipt of a NACK, and/or the like.

As shown by reference number 815, the UE 120 may determine a second bandwidth part (e.g., shown as BWP 2) for transmitting the uplink communication based at least in part on determining that the uplink communication has failed on the first NOMA bandwidth part. In some aspects, the UE 120 may determine the second bandwidth part based at least in part on a bandwidth part switching configuration. The bandwidth part switching configuration may be signaled to the UE 120 using, for example, a MIB, a SIB, a group common PDCCH, and/or the like. Additionally, or alternatively, switching from the first NOMA bandwidth part to the second bandwidth part may be triggered based at least in part on a scheduling request included in a transmission on a NOMA physical uplink shared channel (PUSCH). Additionally, or alternatively, the UE 120 may determine the second bandwidth part by randomly selecting the second bandwidth part from a set of NOMA bandwidth parts (e.g., which may be signaled to the UE 120 using a bandwidth part configuration, an RRC message, and/or the like).

In some aspects, the second bandwidth part may be a second NOMA bandwidth part, different from the first NOMA bandwidth part on which the uplink communication failed. In some aspects, the second bandwidth part may be an OMA bandwidth part. In either case, the first NOMA bandwidth part and the second (NOMA or OMA) bandwidth part may differ from one another with respect to one or more parameters, such as an MCS, a spreading factor, a PRB size, a frequency location, a numerology, and/or the like.

As shown by reference number 820, the UE 120 may transmit (e.g., re-transmit) the uplink communication on the second bandwidth part. By switching to a second bandwidth part when an uplink communication on a first NOMA bandwidth part fails, latency may be reduced, reliability may be improved, interference may be reduced, and/or the like, due to differences between a first bandwidth part configuration of the first NOMA bandwidth part and a second bandwidth part configuration of the second bandwidth part.

As indicated above, FIG. 8 is provided as an example. Other examples are possible and may differ from what was described with respect to FIG. 8. In some aspects, one or more aspects described in connection with FIG. 8 may be implemented in combination with one or more aspects described elsewhere herein, such as in connection with one or more of FIGS. 5, 6, 7, 9, and/or 10.

Figure 9:
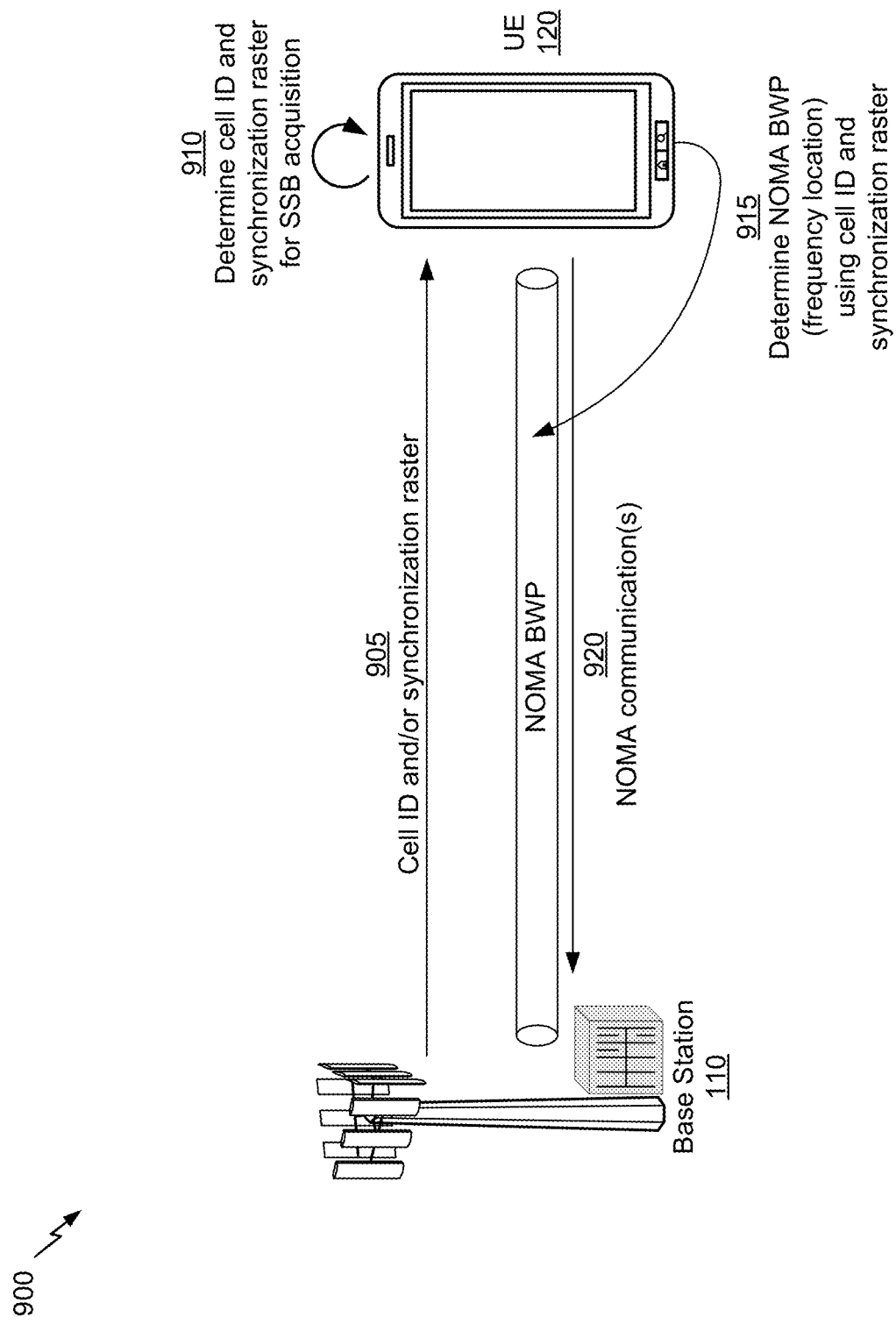

FIG. 9 is a diagram illustrating an example 900 associated with NOMA bandwidth part configuration, in accordance with various aspects of the present disclosure.

As shown by reference number 905, a base station 110 may transmit, and a UE 120 may receive, a cell identifier (e.g., for a cell on which the UE 120 is camped) and/or a synchronization raster to be used for synchronization signal block (SSB) acquisition. A synchronization raster may refer to a range of frequencies to be searched to obtain a cell-defining SSB that carries remaining minimum system information (RMSI) for the cell. In some aspects, the frequencies on a synchronization raster are identifiable with a global synchronization channel number (GSCN) value.

As shown by reference number 910, the UE 120 may determine the cell identifier and/or the synchronization raster. For example, the UE 120 may determine the cell identifier and/or the synchronization raster based at least in part on information received from the base station 110, as described above.

As shown by reference number 915, the UE 120 may determine a NOMA bandwidth part (e.g., a frequency location of the NOMA bandwidth part) based at least in part on the cell identifier and the synchronization raster. In some aspects, the center frequency of the NOMA bandwidth part may be defined as a function of the cell identifier and the synchronization raster.

As shown by reference number 920, the UE 120 may transmit one or more NOMA communications on the determined NOMA bandwidth part. For example, the UE 120 may transmit the one or more NOMA communications at one or more frequencies included in the NOMA bandwidth part. The frequencies included in the NOMA bandwidth part may be determined based at least in part on a center frequency of the NOMA bandwidth part (e.g., determined using the cell identifier and/or the synchronization raster) and a bandwidth of the NOMA bandwidth part (e.g., which may be signaled in a bandwidth part configuration, as described elsewhere herein).

By using cell-specific mapping of NOMA bandwidth parts to frequencies, inter-cell interference may be reduced (e.g., through randomization using a cell identifier). Furthermore, by using the cell identifier and the synchronization raster to signal the frequency location of the NOMA bandwidth part, overhead may be conserved that would otherwise be used for explicit signaling of the frequency location of the NOMA bandwidth part. This may also simplify NOMA bandwidth part switching (e.g., as described above in connection with FIG. 8) if frequency locations of multiple NOMA bandwidth parts are determined using the same parameters (e.g., cell identifier and/or synchronization raster). Furthermore, one or more parameters used for NOMA communications, such as a pathloss measurement for power multiplexing and/or UE grouping, may be determined using an SSB and/or a tracking reference signal (TRS).

In some aspects, the NOMA bandwidth part is located at an edge of a system bandwidth. In this case, a guard band may be located at an end of the NOMA bandwidth part other than the end that is located at the edge of the system bandwidth. In some aspects, the NOMA bandwidth part may not be located at an edge of a system bandwidth. In this case, a first guard band is located at a first end of the NOMA bandwidth part and a second guard band is located at a second end of the NOMA bandwidth part. In this way, a two-step RACH procedure used in the NOMA bandwidth part can avoid collision with a four-step RACH procedure, which may have a different numerology than the two-step RACH procedure. Furthermore, the guard band can reduce interference when low-density spreading and/or power boosting is used for NOMA communications. Additional detail are described below in connection with FIG. 10.

As indicated above, FIG. 9 is provided as an example. Other examples are possible and may differ from what was described with respect to FIG. 9. In some aspects, one or more aspects described in connection with FIG. 9 may be implemented in combination with one or more aspects described elsewhere herein, such as in connection with one or more of FIGS. 5, 6, 7, 8, and/or 10.

Figure 10:
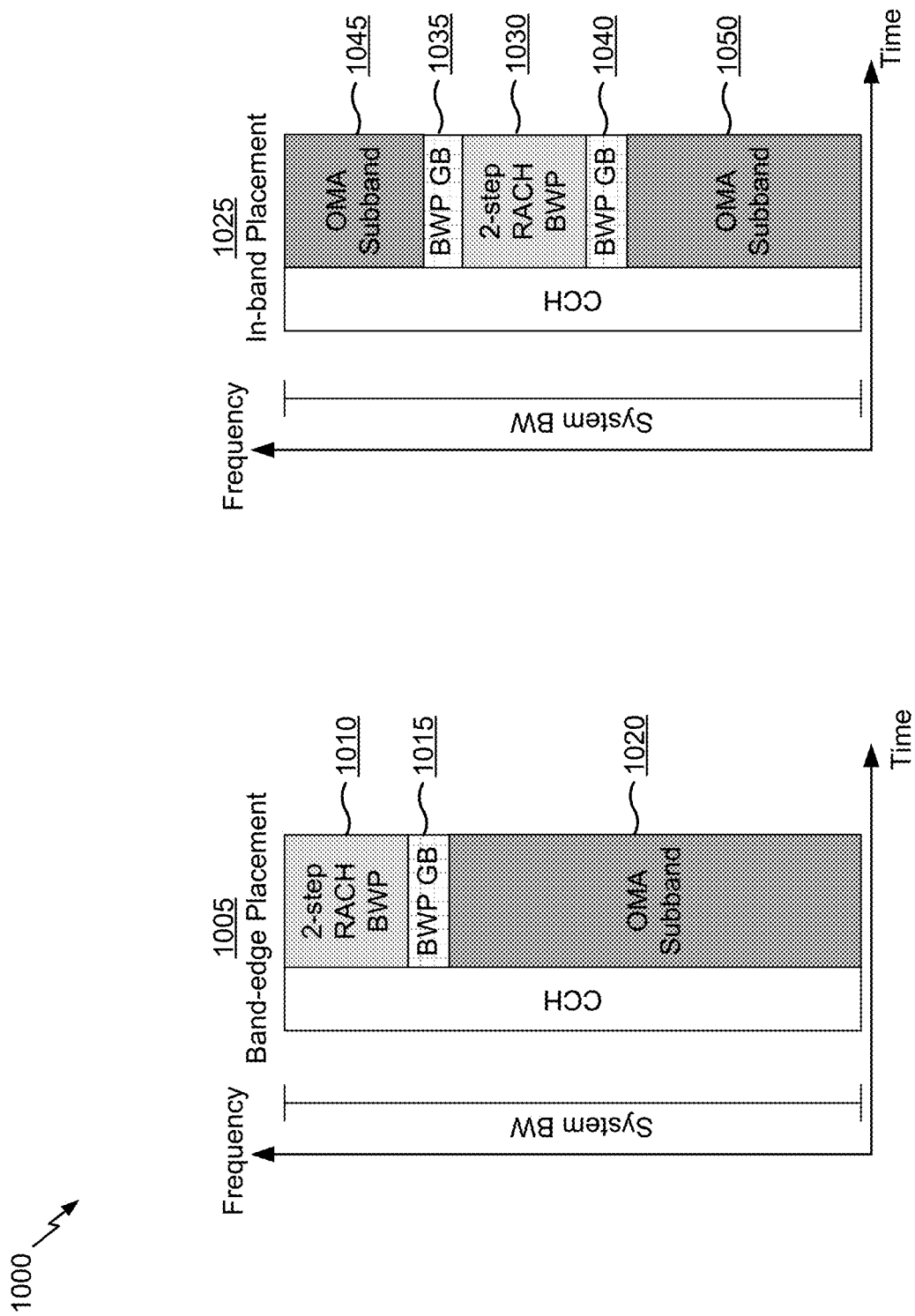

FIG. 10 is a diagram illustrating an example 1000 associated with NOMA bandwidth part configuration, in accordance with various aspects of the present disclosure.

As shown by reference number 1005, in some aspects, a NOMA bandwidth part 1010 may be located at an edge of a system bandwidth. In some aspects, a two-step RACH procedure may be used for the NOMA bandwidth part 1010. In this case, a guard band (GB) 1015 may be located at an end of the NOMA bandwidth part 1010 other than the end that is located at the edge of the system bandwidth, as shown. In this way, collision between the two-step RACH procedure and a four-step RACH procedure, used for an OMA bandwidth part 1020, may be avoided. When the NOMA bandwidth part 1010 is located at an edge of the system bandwidth (e.g., band-edge placement), this may reduce overhead needed for guard band(s) as compared to in-band placement, which may require two guard bands, as described below.

In some aspects, multiple NOMA bandwidth parts (e.g., that use a two-step RACH procedure) may be placed adjacent to one another along the system bandwidth. For example, the NOMA bandwidth part 1010 shown in FIG. 10 may represent multiple NOMA bandwidth parts (e.g., used for different operation modes, such as eMBB, MTC, URLLC, and/or the like). In this case, fewer guard bands may be needed to avoid collision between bandwidth parts that use a two-step RACH procedure and bandwidth parts that use a four-step RACH procedure, thereby reducing system overhead. Additionally, or alternatively, a first NOMA bandwidth part may be located at a first edge of the system bandwidth, and a second NOMA bandwidth part may be located at a second edge of the system bandwidth (e.g., as shown in FIG. 7).

As shown by reference number 1025, in some aspects, a NOMA bandwidth part 1030 may not be located at an edge of a system bandwidth. In some aspects, a two-step RACH procedure may be used for the NOMA bandwidth part 1030. In this case, a first guard band 1035 may be located at a first end of the NOMA bandwidth part 1030 and a second guard band 1040 may be located at a second end of the NOMA bandwidth part 1030. In this way, collision between the two-step RACH procedure and a four-step RACH procedure, used for a first OMA bandwidth part 1045 and a second OMA bandwidth part 1050, may be avoided. Such in-band placement of the NOMA bandwidth part 1030 permits increased flexibility in placement of NOMA bandwidth parts as compared to placing NOMA bandwidth parts at an edge of the system bandwidth.

In some aspects, multiple NOMA bandwidth parts (e.g., that use a two-step RACH procedure) may be placed adjacent to one another along the system bandwidth. For example, the NOMA bandwidth part 1030 shown in FIG. 10 may represent multiple NOMA bandwidth parts (e.g., used for different operation modes, such as eMBB, MTC, URLLC, and/or the like). In this case, fewer guard bands may be needed to avoid collision between bandwidth parts that use a two-step RACH procedure and bandwidth parts that use a four-step RACH procedure, thereby reducing system overhead.

As indicated above, FIG. 10 is provided as an example. Other examples are possible and may differ from what was described with respect to FIG. 10. In some aspects, one or more aspects described in connection with FIG. 10 may be implemented in combination with one or more aspects described elsewhere herein, such as in connection with one or more of FIGS. 5, 6, 7, 8, and/or 9.

Figure 11:
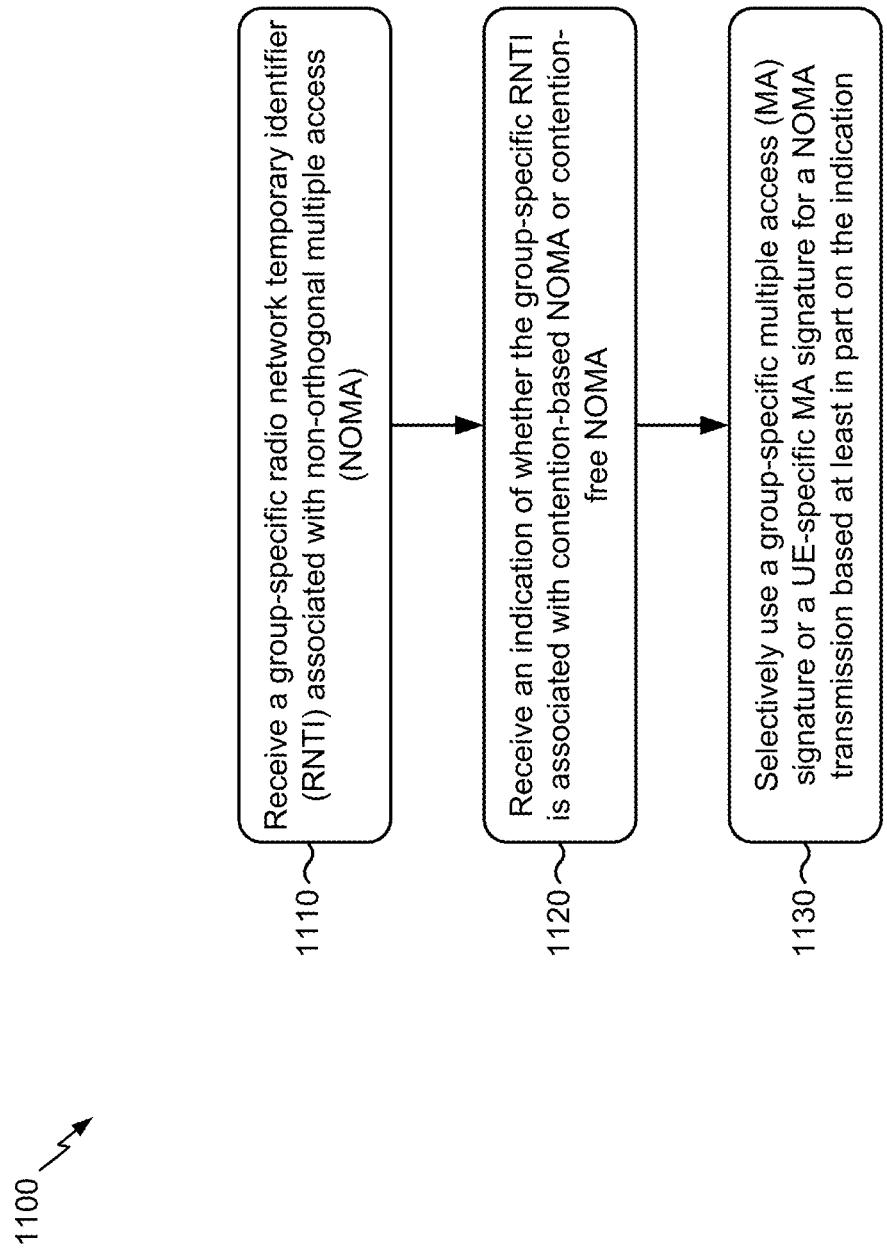
FIGS. 11-14 are diagrams illustrating example processes associated with non-orthogonal multiple access (NOMA) bandwidth part configuration, in accordance with various aspects of the present disclosure.

FIG. 11 is a diagram illustrating an example process 1100 performed, for example, by a UE, in accordance with various aspects of the present disclosure. Example process 1100 is an example where a UE (e.g., UE 120 and/or the like) performs operations associated with NOMA bandwidth part configuration.

As shown in FIG. 11, in some aspects, process 1100 may include receiving a group-specific radio network temporary identifier (RNTI) associated with non-orthogonal multiple access (NOMA) (block 1110). For example, the UE (e.g., using antenna 252, DEMOD 254, MIMO detector 256, receive processor 258, controller/processor 280, and/or the like) may receive a group-specific RNTI associated with NOMA, as described above in connection with FIG. 5.

As further shown in FIG. 11, in some aspects, process 1100 may include receiving an indication of whether the group-specific RNTI is associated with contention-based NOMA or contention-free NOMA (block 1120). For example, the UE (e.g., using antenna 252, DEMOD 254, MIMO detector 256, receive processor 258, controller/processor 280, and/or the like) may receive an indication of whether the group-specific RNTI is associated with contention-based NOMA or contention-free NOMA, as described above in connection with FIG. 5.

As further shown in FIG. 11, in some aspects, process 1100 may include selectively using a group-specific multiple access (MA) signature or a UE-specific MA signature for a NOMA transmission based at least in part on the indication (block 1130). For example, the UE (e.g., using controller/processor 280, transmit processor 264, TX MIMO processor 266, MOD 254, antenna 252, and/or the like) may selectively use a group-specific MA signature or a UE-specific MA signature for a NOMA transmission based at least in part on the indication, as described above in connection with FIG. 5.

Process 1100 may include additional aspects, such as any single aspect or any combination of aspects described below and/or in connection with one or more other processes described elsewhere herein (e.g., process 1200, 1300, and/or 1400).

In a first aspect, the group-specific RNTI is preconfigured by a radio resource control (RRC) message.

In a second aspect, alone or in combination with the first aspect, the group-specific MA signature is generated as a function of the group-specific RNTI and is used for the NOMA transmission when the group-specific RNTI is associated with contention-based NOMA.

In a third aspect, alone or in combination with one or more of the first and second aspects, the group-specific MA signature is randomly selected from a set of group-specific MA signatures. In some aspects, the set of group-specific MA signatures is indicated in a radio resource control (RRC) message.

In a fourth aspect, alone or in combination with one or more of the first through third aspects, the set of group-specific MA signatures is generated as a function of the group-specific RNTI.

In a fifth aspect, alone or in combination with one or more of the first through fourth aspects, the UE-specific MA signature is used for the NOMA transmission when the group-specific RNTI is associated with contention-free NOMA.

In a sixth aspect, alone or in combination with one or more of the first through fifth aspects, the UE-specific MA signature is indicated in downlink control information (DCI).

In a seventh aspect, alone or in combination with one or more of the first through sixth aspects, the UE-specific MA signature is obtained using the group-specific RNTI.

In an eighth aspect, alone or in combination with one or more of the first through seventh aspects, the group-specific RNTI is used to monitor a control resource set associated with NOMA.

In a ninth aspect, alone or in combination with one or more of the first through eighth aspects, the indication is included in the group-specific RNTI.

In a tenth aspect, alone or in combination with one or more of the first through ninth aspects, the NOMA transmission is transmitted on a NOMA bandwidth part determined based at least in part on a bandwidth part configuration signaled to the UE.

In an eleventh aspect, alone or in combination with one or more of the first through tenth aspects, the bandwidth part configuration indicates multiple NOMA bandwidth parts corresponding to multiple NOMA operation modes.

In a twelfth aspect, alone or in combination with one or more of the first through eleventh aspects, the NOMA bandwidth part is determined based at least in part on a NOMA operation mode with which the UE is operating.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
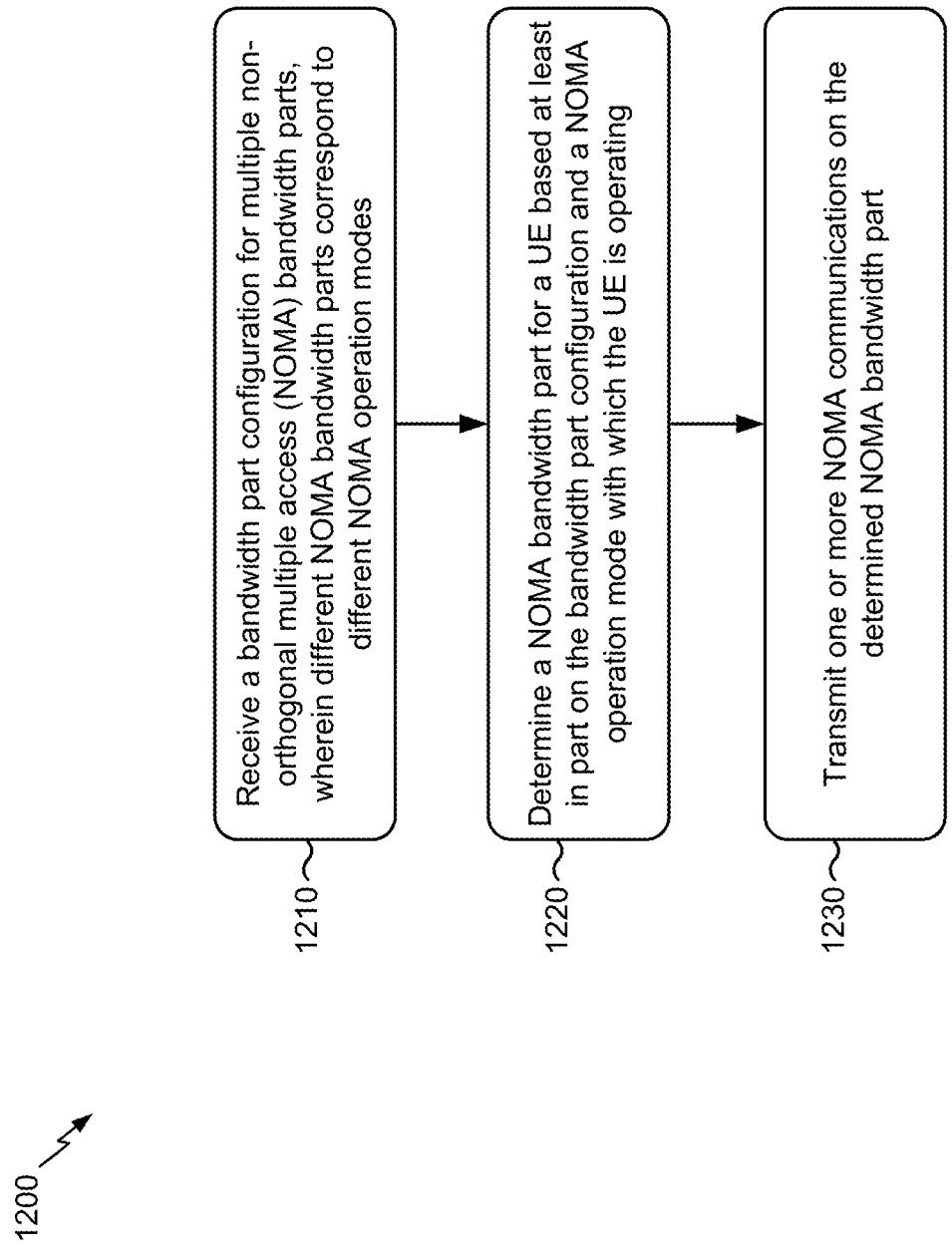

FIG. 12 is a diagram illustrating an example process 1200 performed, for example, by a UE, in accordance with various aspects of the present disclosure. Example process 1200 is an example where a UE (e.g., UE 120 and/or the like) performs operations associated with NOMA bandwidth part configuration.

As shown in FIG. 12, in some aspects, process 1200 may include receiving a bandwidth part configuration for multiple non-orthogonal multiple access (NOMA) bandwidth parts, wherein different NOMA bandwidth parts correspond to different NOMA operation modes (block 1210). For example, the UE (e.g., using antenna 252, DEMOD 254, MIMO detector 256, receive processor 258, controller/processor 280, and/or the like) may receive a bandwidth part configuration for multiple NOMA bandwidth parts, as described above in connection with FIGS. 6-7. In some aspects, different NOMA bandwidth parts correspond to different NOMA operation modes.

As further shown in FIG. 12, in some aspects, process 1200 may include determining a NOMA bandwidth part for a UE based at least in part on the bandwidth part configuration and a NOMA operation mode with which the UE is operating (block 1220). For example, the UE (e.g., using controller/processor 280 and/or the like) may determine a NOMA bandwidth part for the UE based at least in part on the bandwidth part configuration and a NOMA operation mode with which the UE is operating, as described above in connection with FIGS. 6-7.

As further shown in FIG. 12, in some aspects, process 1200 may include transmitting one or more NOMA communications on the determined NOMA bandwidth part (block 1230). For example, the UE (e.g., using controller/processor 280, transmit processor 264, TX MIMO processor 266, MOD 254, antenna 252, and/or the like) may transmit one or more NOMA communications on the determined NOMA bandwidth part, as described above in connection with FIGS. 6-7.

Process 1200 may include additional aspects, such as any single aspect or any combination of aspects described below and/or in connection with one or more other processes described elsewhere herein (e.g., process 1100, 1300, and/or 1400).

In a first aspect, the NOMA operation mode includes one of an enhanced mobile broadband (eMBB) mode, a machine type communication (MTC) mode, or an ultra-reliable low latency communication (URLLC) mode.

In a second aspect, alone or in combination with the first aspect, the bandwidth part configuration is included in a radio resource control (RRC) message.

In a third aspect, alone or in combination with one or more of the first and second aspects, the NOMA bandwidth part is determined based at least in part on overriding the bandwidth part configuration, indicated in a radio resource control (RRC) message, using a bandwidth part configuration indicated in downlink control information (DCI).

In a fourth aspect, alone or in combination with one or more of the first through third aspects, the multiple NOMA bandwidth parts are multiplexed with one another in at least one of a time domain or a frequency domain.

In a fifth aspect, alone or in combination with one or more of the first through fourth aspects, the multiple NOMA bandwidth parts are multiplexed with an orthogonal multiple access (OMA) bandwidth part in at least one of a time domain or a frequency domain.

In a sixth aspect, alone or in combination with one or more of the first through fifth aspects, the bandwidth part configuration indicates a periodicity of the NOMA bandwidth part.

In a seventh aspect, alone or in combination with one or more of the first through sixth aspects, different NOMA bandwidth parts have different periodicities, and the different periodicities are indicated in the bandwidth part configuration.

In an eighth aspect, alone or in combination with one or more of the first through seventh aspects, one or more NOMA communications are transmitted using a multiple access (MA) signature determined based at least in part on whether the determined NOMA bandwidth part is associated with contention-based NOMA or contention-free NOMA.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
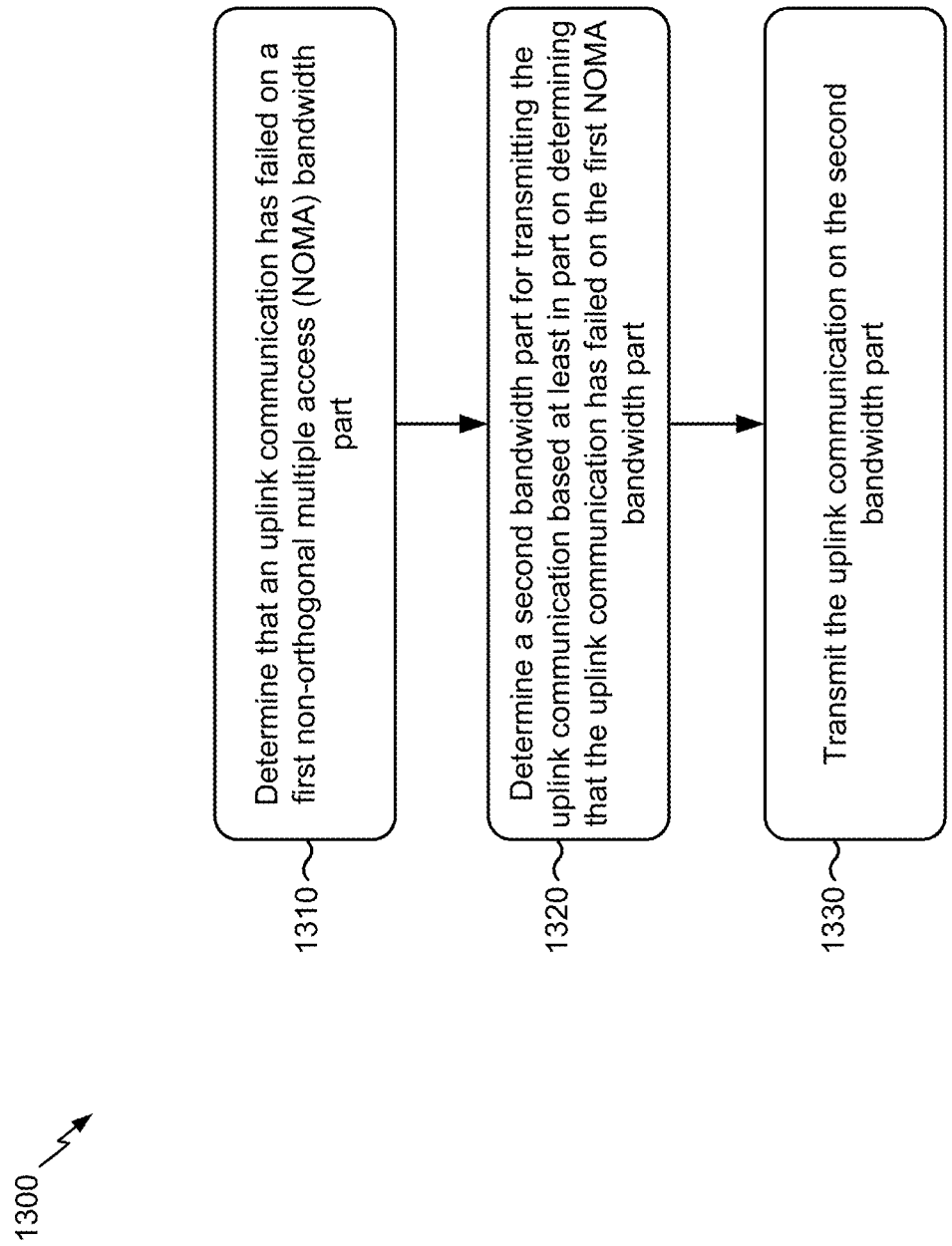

FIG. 13 is a diagram illustrating an example process 1300 performed, for example, by a UE, in accordance with various aspects of the present disclosure. Example process 1300 is an example where a UE (e.g., UE 120 and/or the like) performs operations associated with NOMA bandwidth part configuration.

As shown in FIG. 13, in some aspects, process 1300 may include determining that an uplink communication has failed on a first non-orthogonal multiple access (NOMA) bandwidth part (block 1310). For example, the UE (e.g., using controller/processor 280 and/or the like) may determine that an uplink communication has failed on a first NOMA bandwidth part, as described above in connection with FIG. 8.

As further shown in FIG. 13, in some aspects, process 1300 may include determining a second bandwidth part for transmitting the uplink communication based at least in part on determining that the uplink communication has failed on the first NOMA bandwidth part (block 1320). For example, the UE (e.g., using controller/processor 280 and/or the like) may determine a second bandwidth part for transmitting the uplink communication based at least in part on determining that the uplink communication has failed on the first NOMA bandwidth part, as described above in connection with FIG. 8.

As further shown in FIG. 13, in some aspects, process 1300 may include transmitting the uplink communication on the second bandwidth part (block 1330). For example, the UE (e.g., using controller/processor 280, transmit processor 264, TX MIMO processor 266, MOD 254, antenna 252, and/or the like) may transmit the uplink communication on the second bandwidth part, as described above in connection with FIG. 8.

Process 1300 may include additional aspects, such as any single aspect or any combination of aspects described below and/or in connection with one or more other processes described elsewhere herein (e.g., process 1100, 1200, and/or 1400).

In a first aspect, the second bandwidth part is a second NOMA bandwidth part.

In a second aspect, alone or in combination with the first aspect, the second bandwidth part is an orthogonal multiple access (OMA) bandwidth part.

In a third aspect, alone or in combination with one or more of the first and second aspects, the second bandwidth part is determined based at least in part on a bandwidth part switching configuration signaled in at least one of: a master information block, a system information block, a group common physical downlink control channel, or a combination thereof.

In a fourth aspect, alone or in combination with one or more of the first through third aspects, switching from the first NOMA bandwidth part to the second bandwidth part is triggered based at least in part on a scheduling request included in a transmission on a NOMA physical uplink shared channel.

In a fifth aspect, alone or in combination with one or more of the first through fourth aspects, the second bandwidth part is determined based at least in part on randomly selecting the second bandwidth part from a set of NOMA bandwidth parts.

In a sixth aspect, alone or in combination with one or more of the first through fifth aspects, the first NOMA bandwidth part and the second bandwidth part differ with respect to at least one of a modulation and coding scheme, a spreading factor, a physical resource block size, a frequency location, a numerology, or a combination thereof.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
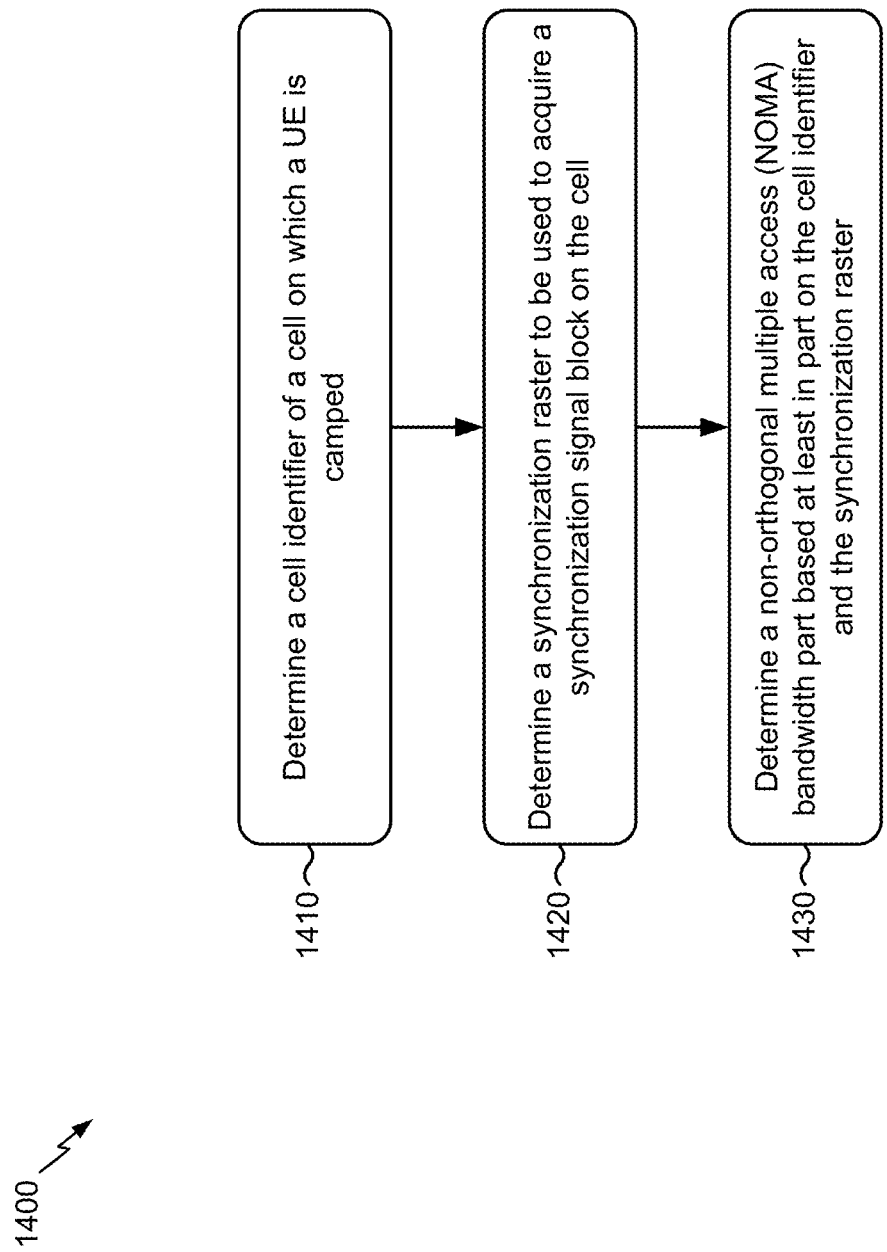

FIG. 14 is a diagram illustrating an example process 1400 performed, for example, by a UE, in accordance with various aspects of the present disclosure. Example process 1400 is an example where a UE (e.g., UE 120 and/or the like) performs operations associated with NOMA bandwidth part configuration.

As shown in FIG. 14, in some aspects, process 1400 may include determining a cell identifier of a cell on which a UE is camped (block 1410). For example, the UE (e.g., using controller/processor 280 and/or the like) may determine a cell identifier of a cell on which the UE is camped, as described above in connection with FIGS. 9-10.

As further shown in FIG. 14, in some aspects, process 1400 may include determining a synchronization raster to be used to acquire a synchronization signal block on the cell (block 1420). For example, the UE (e.g., using controller/processor 280 and/or the like) may determine a synchronization raster to be used to acquire a synchronization signal block on the cell, as described above in connection with FIGS. 9-10.

As further shown in FIG. 14, in some aspects, process 1400 may include determining a non-orthogonal multiple access (NOMA) bandwidth part based at least in part on the cell identifier and the synchronization raster (block 1430). For example, the UE (e.g., using controller/processor 280 and/or the like) may determine a NOMA bandwidth part based at least in part on the cell identifier and the synchronization raster, as described above in connection with FIGS. 9-10.

Process 1400 may include additional aspects, such as any single aspect or any combination of aspects described below and/or in connection with one or more other processes described elsewhere herein (e.g., process 1100, 1200, and/or 1300).

In a first aspect, the NOMA bandwidth part is located at an edge of a system bandwidth.

In a second aspect, alone or in combination with the first aspect, a guard band is located at an end of the NOMA bandwidth part other than the end that is located at the edge of the system bandwidth.

In a third aspect, alone or in combination with one or more of the first and second aspects, the NOMA bandwidth part is not located at an edge of a system bandwidth.

In a fourth aspect, alone or in combination with one or more of the first through third aspects, a first guard band is located at a first end of the NOMA bandwidth part and a second guard band is located at a second end of the NOMA bandwidth part.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
receiving, from a base station, a group-specific radio network temporary identifier (RNTI) associated with non-orthogonal multiple access (NOMA);
receiving, from the base station, an indication of whether the group-specific RNTI is associated with contention-based NOMA or contention-free NOMA,
wherein the indication is included in a flag field of the group-specific RNTI,
wherein a first value of the flag field is associated with contention-based NOMA, and
wherein a second value of the flag field is associated with contention-free NOMA; and
selectively using a group-specific multiple access (MA) signature or a UE-specific MA signature for a NOMA transmission based at least in part on the indication.

2. The method of claim 1, wherein the group-specific RNTI is preconfigured by a radio resource control (RRC) message, and wherein the group-specific MA signature is generated as a function of the group-specific RNTI and is used for the NOMA transmission when the group-specific RNTI is associated with contention-based NOMA.

3. The method of claim 1, wherein the group-specific RNTI is preconfigured by a radio resource control (RRC) message, and wherein the group-specific MA signature is randomly selected from a set of group-specific MA signatures.

4. The method of claim 3, wherein the set of group-specific MA signatures is indicated in a radio resource control (RRC) message or is generated as a function of the group-specific RNTI.

5. The method of claim 1, wherein the UE-specific MA signature is used for the NOMA transmission when the group-specific RNTI is associated with contention-free NOMA.

6. The method of claim 5, wherein the UE-specific MA signature is indicated in downlink control information (DCI) or is obtained using the group-specific RNTI.

7. The method of claim 1, wherein the group-specific RNTI is used to monitor a control resource set associated with NOMA.

8. The method of claim 1, wherein the NOMA transmission is transmitted on a NOMA bandwidth part determined based at least in part on a bandwidth part configuration signaled to the UE.

9. The method of claim 8, wherein the bandwidth part configuration indicates multiple NOMA bandwidth parts corresponding to multiple NOMA operation modes, and wherein the NOMA bandwidth part is determined based at least in part on a NOMA operation mode with which the UE is operating.

10. A method of wireless communication performed by a user equipment (UE), comprising:
receiving a bandwidth part configuration for multiple non-orthogonal multiple access (NOMA) bandwidth parts,
wherein different NOMA bandwidth parts correspond to different NOMA operation modes, and
wherein a first NOMA bandwidth part corresponds to an enhanced mobile broadband (eMBB) mode, a second NOMA bandwidth part corresponds to a machine type communication (MTC) mode, and a third NOMA bandwidth part corresponds to an ultra-reliable low latency communication (URLLC) mode;
determining a NOMA bandwidth part for the UE based at least in part on the bandwidth part configuration and a NOMA operation mode with which the UE is operating; and
transmitting one or more NOMA communications on the determined NOMA bandwidth part.

11. The method of claim 10, wherein the bandwidth part configuration is included in a radio resource control (RRC) message.

12. The method of claim 10, wherein the NOMA bandwidth part is determined based at least in part on overriding the bandwidth part configuration, indicated in a radio resource control (RRC) message, using a bandwidth part configuration indicated in downlink control information (DCI).

13. The method of claim 10, wherein the multiple NOMA bandwidth parts are multiplexed with one another in at least one of a time domain or a frequency domain.

14. The method of claim 10, wherein the multiple NOMA bandwidth parts are multiplexed with an orthogonal multiple access (OMA) bandwidth part in at least one of a time domain or a frequency domain.

15. The method of claim 10, wherein the bandwidth part configuration indicates a periodicity of the NOMA bandwidth part.

16. The method of claim 10, wherein different NOMA bandwidth parts have different periodicities, and wherein the different periodicities are indicated in the bandwidth part configuration.

17. The method of claim 10, wherein the one or more NOMA communications are transmitted using a multiple access (MA) signature determined based at least in part on whether the determined NOMA bandwidth part is associated with contention-based NOMA or contention-free NOMA.

18. A user equipment (UE) for wireless communication, comprising:
a memory; and
one or more processors coupled to the memory, the memory and the one or more processors configured to:
receive, from a base station, a group-specific radio network temporary identifier (RNTI) associated with non-orthogonal multiple access (NOMA);
receive, from a base station, an indication of whether the group-specific RNTI is associated with contention-based NOMA or contention-free NOMA,
wherein the indication is included in a flag field of the group-specific RNTI,
wherein a first value of the flag field is associated with contention-based NOMA, and
wherein a second value of the flag field is associated with contention-free NOMA; and
selectively use a group-specific multiple access (MA) signature or a UE-specific MA signature for a NOMA transmission based at least in part on the indication.

19. The UE of claim 18, wherein the group-specific RNTI is preconfigured by a radio resource control (RRC) message, and wherein the group-specific MA signature is generated as a function of the group-specific RNTI and is used for the NOMA transmission when the group-specific RNTI is associated with contention-based NOMA.

20. The UE of claim 18, wherein the group-specific RNTI is preconfigured by a radio resource control (RRC) message, and wherein the group-specific MA signature is randomly selected from a set of group-specific MA signatures.

21. The UE of claim 18, wherein the UE-specific MA signature is used for the NOMA transmission when the group-specific RNTI is associated with contention-free NOMA.

22. The UE of claim 18, wherein the group-specific RNTI is used to monitor a control resource set associated with NOMA.

23. The UE of claim 18, wherein the NOMA transmission is transmitted on a NOMA bandwidth part determined based at least in part on a bandwidth part configuration signaled to the UE.

24. The UE claim 18, wherein the set of group-specific MA signatures is indicated in a radio resource control (RRC) message or is generated as a function of the group-specific RNTI.

25. A user equipment (UE) for wireless communication, comprising:
a memory; and
one or more processors coupled to the memory, the memory and the one or more processors configured to:
receive a bandwidth part configuration for multiple non-orthogonal multiple access (NOMA) bandwidth parts,
wherein different NOMA bandwidth parts correspond to different NOMA operation modes, and
wherein a first NOMA bandwidth part corresponds to an enhanced mobile broadband (eMBB) mode, a second NOMA bandwidth part corresponds to a machine type communication (MTC) mode, and a third NOMA bandwidth part corresponds to an ultra-reliable low latency communication (URLLC) mode;

determine a NOMA bandwidth part for the UE based at least in part on the bandwidth part configuration and a NOMA operation mode with which the UE is operating; and transmit one or more NOMA communications on the determined NOMA bandwidth part.

26. The UE of claim 24, wherein the bandwidth part configuration is included in a radio resource control (RRC) message.

27. The UE of claim 24, wherein the NOMA bandwidth part is determined based at least in part on overriding the bandwidth part configuration, indicated in a radio resource control (RRC) message, using a bandwidth part configuration indicated in downlink control information (DCI).

28. The UE of claim 24, wherein the multiple NOMA bandwidth parts are multiplexed with one another in at least one of a time domain or a frequency domain.

29. The UE of claim 24, wherein the one or more NOMA communications are transmitted using a multiple access (MA) signature determined based at least in part on whether the determined NOMA bandwidth part is associated with contention-based NOMA or contention-free NOMA.

30. The UE of claim 24, wherein different NOMA bandwidth parts have different periodicities, and wherein the different periodicities are indicated in the bandwidth part configuration.

* * * * *